United States Patent
Jarvinen

(10) Patent No.: US 7,439,877 B1
(45) Date of Patent: Oct. 21, 2008

(54) TOTAL IMPEDANCE AND COMPLEX DIELECTRIC PROPERTY ICE DETECTION SYSTEM

(76) Inventor: Philip Onni Jarvinen, 15 Fairway Dr., Amherst, NH (US) 03031

(*) Notice: Subject to any disclaimer, the term of this patent is extended or adjusted under 35 U.S.C. 154(b) by 0 days.

(21) Appl. No.: 11/804,701

(22) Filed: May 18, 2007

(51) Int. Cl.
G08B 21/00 (2006.01)
(52) U.S. Cl. .................................. 340/962; 340/581
(58) Field of Classification Search ............... 340/962, 340/580, 581; 244/134 R
See application file for complete search history.

(56) References Cited

U.S. PATENT DOCUMENTS

| | | |
|---|---|---|
| 2,432,669 A | 12/1947 | Kliever |
| 3,045,223 A | 7/1962 | Kapany et al. |
| 3,976,270 A | 8/1976 | Catchpole |
| 3,996,787 A | 12/1976 | Edgington |
| 4,053,127 A | 10/1977 | Edgington |
| 4,054,255 A | 10/1977 | Magenheim |
| 4,095,456 A | 6/1978 | Edgington |
| 4,553,137 A | 11/1985 | Marxer et al. |
| 4,745,804 A | 5/1988 | Goldberg et al. |
| 4,766,369 A | 8/1988 | Weinstein |
| 4,819,480 A | 4/1989 | Sabin |
| 5,095,754 A | 3/1992 | Hsu et al. |
| 5,140,135 A | 8/1992 | Freeman |
| 5,191,791 A | 3/1993 | Gerardi et al. |
| 5,206,805 A | 4/1993 | Gerardi et al. |
| 5,301,905 A | 4/1994 | Blaha |
| 5,394,340 A | 2/1995 | Inkpen et al. |
| 5,398,547 A | 3/1995 | Gerardi et al. |
| 5,474,261 A | 12/1995 | Stolarczyk et al. |
| 5,521,584 A | 5/1996 | Ortolano et al. |
| 5,523,959 A | 6/1996 | Seegmiller |
| 5,551,288 A | 9/1996 | Gerardi et al. |
| 5,569,850 A | 10/1996 | Rauckhorst, III |
| 5,621,332 A | 4/1997 | Inkpen et al. |
| 5,621,400 A | 4/1997 | Corbi |
| 5,652,522 A | 7/1997 | Kates et al. |
| 5,686,841 A | 11/1997 | Stolarczyk et al. |
| 5,760,711 A | 6/1998 | Burns |
| 5,790,026 A * | 8/1998 | Lardiere et al. ............ 340/581 |
| 5,874,672 A | 2/1999 | Gerardi et al. |
| 5,886,256 A * | 3/1999 | DeAnna ..................... 340/962 |

(Continued)

OTHER PUBLICATIONS

T. L. Samuels, "Meteorological Conditions During the Formation of Ice on Aircraft" NACA TN No. 439, Dec. 1932.

(Continued)

Primary Examiner—John A Tweel, Jr.

(57) ABSTRACT

An ice detection system that detects the onset of ice accreation on an aircraft's external surfaces, continuously measures its thickness and growth time history and provides the type of ice, glaze or rime, is disclosed along with an independent way to confirm that the contaminant is known to be ice and only ice. Total impedance data, thermal conductivity value and complex dielectric properties are used to discriminate between ice, water, deicing fluid and snow with measurements made by low cost, low power consumption, low profile, miniature electronic chips, components and devices collocated together on the external surface in a thin pliant patch that does not effect the airflow about the aircraft. The ice detection system provides ice accreation data and warning signals to displays and aural signaling devices in the cockpit for the pilot and to the control console of a ground controller flying the aircraft if it is unmanned.

20 Claims, 15 Drawing Sheets

U.S. PATENT DOCUMENTS

| | | | |
|---|---|---|---|
| 5,955,887 | A | 9/1999 | Codner et al. |
| 6,166,661 | A | 12/2000 | Anderson et al. |
| 6,304,194 | B1 * | 10/2001 | McKillip .................... 340/962 |
| 6,320,511 | B1 | 11/2001 | Cronin et al. |
| 6,328,467 | B1 | 12/2001 | Keyhani |
| 6,384,611 | B1 | 5/2002 | Wallace et al. |
| 6,425,286 | B1 | 7/2002 | Anderson et al. |
| 6,430,996 | B1 | 8/2002 | Anderson et al. |
| 6,608,489 | B2 | 8/2003 | Yankielun et al. |
| 6,653,598 | B2 | 11/2003 | Petrenko et al. |
| 6,731,225 | B2 | 5/2004 | Vopat |
| 6,879,168 | B2 | 4/2005 | Baas et al. |
| 6,995,572 | B2 | 2/2006 | Arndt et al. |
| 7,000,871 | B2 * | 2/2006 | Barre et al. ................. 340/580 |

OTHER PUBLICATIONS

J. W. Valvano, et al., "The Simultaneous Measurement of Thermal Conductivity, Thermal Diffusivity, and Perfusion in Small Volumes of Tissue", Trans. of ASME, 192, vol. 106, Aug. 1984.

W. D. Coles, "Experimental Determination of Thermal Conductivity of Low Density Ice", NACA Technical Note 3143, Mar. 1954.

P. Jarvinen, "Aircraft Ice Detection Method" AIAA Paper 2007-0689, Proceedings of the 45th Aerospace Sciences Meeting and Exhibit, Jan. 8-11, 2007, Reno, NV.

Analog Devices Model AD5933, "1 MSPS, 12-Bit Impedance Converter, Network Analyzer AD5933".

Analog Devices Application Note AN-843, "Measuring a Loudspeaker Impedance Profile Using the AD5933".

P. V. Hobbs, Ice Physics, pp. 82 thru 87, Clarendon Press, Oxford, 1974.

R. P. Auty, "Dielectric Constants of Solid H2O and D2O", PhD Thesis, Brown University Apr. 1951.

* cited by examiner

View A-A

View B-B, View C-C, and View D-D

US 7,439,877 B1

TOTAL IMPEDANCE AND COMPLEX DIELECTRIC PROPERTY ICE DETECTION SYSTEM

COPYRIGHT NOTICE

A portion of the disclosure of this patent document contains material that is subject to copyright protection. The copyright owner has no objection to facsimile reproduction of the patent document or the patent disclosure, as it appears in the Patent and Trademark Office patent file or records, but otherwise reserves all copyright rights whatsoever.

FIELD OF THE INVENTION

The invention relates to the field of ice detection on an aircraft in flight or on the ground prior to takeoff using total impedance, thermal conductivity and complex dielectric property measurements.

BACKGROUND OF INVENTION

The fatal crash of a commercial airliner, American Eagle Flight 4184, an ATR-72 aircraft, on Oct. 31, 1994 near Roselawn, Ind. with the loss of all 68 on-board and the more recent crash on Feb. 16, 2005 of a Cessna Citation corporate jet owned by Circuit City during approach to the Pueblo, Colo. airport killing the two pilots and six other people on-board, both events attributed to aircraft icing by the National Transportation Safety Board (NTSB), emphasize the importance of knowing when ice is accreating on an aircraft. Icing in these cases caused detrimental loss of control and a dramatic increase in aircraft stall speed, respectively, which in turn went unrecognized leading to the fatalities. Besides these two examples for manned aircraft, there have been additional crashes of unmanned aircraft due to icing, for example, while being used by various nations in the Kosovo conflict. It is also important to know what type of ice is accreating on an aircraft or unmanned vehicle and at what rate for the added weight of accumulated ice may effect aircraft performance and its presence may also significantly interfere with the generation of lift by altering the airfoil shape or causing loss of control surface effectiveness.

Ice principally occurs from supercooled water droplets in the atmosphere that freeze on the aircraft at atmospheric and aircraft surface temperatures in the range from 0° C. to −25 C and at altitudes between sea level and 22,000 feet as discussed in the paper entitled "Meteorological Conditions During the Formation of Ice on Aircraft", Samuels, T. L., NACA TN No. 439, December 1932 though on occasion ice occurs outside these ranges. Two forms of ice may be encountered: glaze or rime ice. Glaze ice is clear in appearance and weighs 0.98-0.99 g/cubic cm, while rime is white and opaque in appearance and weighs between 0.35-0.55 g/cubic cm depending on aircraft Mach number at which it was accreated. It should be noted that glaze ice will add a substantially higher weight penalty than rime ice for the same volume of accreated ice. The present invention is designed to operate over an extended temperature range from above 0 C to −40 C to encompass all probable conditions for icing.

Numerous methods and apparatus have been patented for the detection of ice on the exterior surfaces of an aircraft and for the determination of ice thickness. In the review of prior art that follows, prior art is grouped by the method used to determine ice presence and thickness. Major groupings to be considered include those that utilize acoustic/ultrasound, pneumatic, electrical, heat, light, mechanical, radiation by electrical means, time domain reflectometry or transmission line approaches. Other groupings include capacitance or impedance approaches for ice detection with a review of those two categories following the first grouping. The purpose in reviewing such a large, far ranging portion of prior art, as is done below, is to demonstrate that no patent in the prior art for ice detection provides a measurement approach that operates continuously in time to determine the type of ice being accreated, glaze or rime, or its thickness which is a claim of the present invention. The review of prior art also demonstrates that no patent in the prior art for ice detection provides an independent measurement that guarantees that the contaminant being accreated is known to be ice and only ice; another claim of the present invention.

As will be described in more detail in the following, the present invention provides a continuous means to identify the presence of ice, thickness of ice, thickness time history of ice, and type of accreated ice, glaze or rime, as well as providing means to discriminate between glaze ice, rime ice, rain water, deicing fluid, snow, or air. In addition, the present invention includes a separate test of the contaminant to reconfirm that what is initially detected to be ice is indeed ice and only ice and not something else. This is done by confirming a particular signature that ice has in complex dielectric space; a semi-circular locus. Prior art is now reviewed in the sequence of groupings discussed above.

Prior art for ice detection includes acoustic/ultrasound systems of Hsu et al. in U.S. Pat. No. 5,095,754 and Vopat in U.S. Pat. No. 6,731,225. Prior art utilizing pneumatic principles is that of Catchpole in U.S. Pat. No. 3,976,270, Edgington in U.S. Pat. No. 3,996,787, U.S. Pat. No. 4,053,127 and U.S. Pat. No. 4,095,456, and Blaha in U.S. Pat. No. 5,301,905. Prior art utilizing electrical principles is that of Gerardi et al. in U.S. Pat. No. 5,206,806, by Inkpen et al. in U.S. Pat. No. 5,394,340 and U.S. Pat. No. 5,621,332, by Corbi in U.S. Pat. No. 5,621,400 and by Petrenko et al. in U.S. Pat. No. 6,653,598.

Prior art utilizing the principle of internal heat transfer is that by Sabin in U.S. Pat. No. 4,819,480, by Freeman in U.S. Pat. No. 5,140,135, by Ortolano in U.S. Pat. No. 5,521,584 and by Keyhani in U.S. Pat. No. 6,328,467. Prior art utilizing the principle of light reflection and/or obturation is that by Kapany et al. in U.S. Pat. No. 3,045,223, by Burns in U.S. Pat. No. 5,760,711 and by Anderson et al. in U.S. Pat. No. 6,425,286 and U.S. Pat. No. 6,430,996. Prior art utilizing mechanical vibration or compressive strength principles is that by Marxer et al. in U.S. Pat. No. 4,553,137, by Goldberg et al. in U.S. Pat. No. 4,745,804 and by Cronin in U.S. Pat. No. 6,320,511.

Prior art utilizing radiation by electrical means is that by Magenheim in U.S. Pat. No. 4,054,255, by Seegmiller in U.S. Pat. No. 5,523,959, by Kates et al. in U.S. Pat. No. 5,652,522, by Stolarczyk et al. in U.S. Pat. No. 5,686,841 and by Anderson et al. in U.S. Pat. No. 6,166,66. Prior art utilizing time domain reflectometry (TDR) or transmission line principles is that by Yankielun et al. in U.S. Pat. No. 6,608,489 and by Arndt et al. in U.S. Pat. No. 6,995,572.

Prior art utilizing capacitance principles is that by Weinstein in U.S. Pat. No. 4,766,369, by Gerardi et al. in U.S. Pat. No. 5,191,791, U.S. Pat. No. 5,398,547, U.S. Pat. No. 5,551,288 and U.S. Pat. No. 5,874,672 and by Baas et al. in U.S. Pat. No. 6,879,168. Prior art utilizing impedance principles is that by Klieve in U.S. Pat. No. 2,432,669, by Stolarczyk et al. in U.S. Pat. No. 5,474,261, by Rauckhorst et al. in U.S. Pat. No. 5,569,850, by Inkpen et al. in U.S. Pat. No. 5,621,332, by Codner et al. in U.S. Pat. No. 5,955,887 and by Wallace et al. in U.S. Pat. No. 6,384,611.

The ultimate ice detection system for an aircraft in flight should be able to detect the presence of ice when it first starts to accreate on the aircraft and to provide a continuous measurement of ice thickness with time after icing onset or after a deicing cycle. It should be able to discriminate between different types of contaminant that might overlay the sensor such as ice, rain water, deicing fluid, or snow so that it may be sure that it is ice and not, for example, rain water or other contaminant. It should be able to identify the type of ice that is accreating: glaze or rime. It should have integral to itself a means to absolutely confirm that it is ice that is accreating rather than just being an approach that assumes without confirmation that the contaminant is ice. Finally, if it is to be used to detect contaminant build-up on an aircraft sitting at a gate on the ground before takeoff or after deicing on the ground, it should have the ability to provide presence and thickness measurements for ice, snow and sleet should these be the contaminating agents that are being deposited. The features of prior art patents identified in the four preceding paragraphs will now be compared to the desired characteristics listed here for the ultimate ice detection method for an aircraft in flight.

Such a comparison has been made and it shows that sixteen of the forty one prior art patents only detect the presence of ice and nothing else. An additional twelve patents detect the presence of ice and provide thickness values and thickness time histories. The remaining thirteen patents detect the presence of ice, provide ice thickness and thickness history and say they are able to discriminate between types of contaminants including ice, rain water and deicing fluid. But none of the patents is found to be able to continuously identify the type of ice, glaze or rime, or provide a continuous measurement of ice thickness or that ice is accreating nor do any of the patents provide a means for an independent crosscheck that the contaminant is indeed ice. The following thirteen patents of the forty one patent set are believed to provide presence, intermittent thickness, intermittent thickness time history and discrimination between ice, rain water and deicing fluid: U.S. Pat. No. 5,095,754, U.S. Pat. No. 5,394,340, U.S. Pat. No. 5,398,547, U.S. Pat. No. 5,474,261, U.S. Pat. No. 5,551,288, U.S. Pat. No. 5,569,850, U.S. Pat. No. 5,621,332, U.S. Pat. No. 5,686,841, U.S. Pat. No. 5,760,711, U.S. Pat. No. 5,874,672, U.S. Pat. No. 6,384,611, U.S. Pat. No. 6,608,489 and U.S. Pat. No. 6,995,572. The present invention will now be described and shown to meet the requirements discussed above for the ultimate ice detection system for use in flight. The present invention provides an indication of ice onset, ice thickness, and ice thickness time history and discriminates between contaminants and type of ice, glaze or rime, as well as providing an independent crosscheck that ice is the contaminant.

SUMMARY OF THE INVENTION

The preferred embodiment of the present invention consists of an ice sensor subsystem, a total impedance measurement subsystem, a thermal conductivity measurement subsystem, and a local temperature measurement subsystem. Additional elements include memory, processor, control, power and readout electronic units, data storage and software units, and a data/warning signal communication unit which transmits to display and aural units located in the cockpit for the pilot or integral with the ground controller's equipment for unmanned aircraft. A miniature electronic chip, collocated with the ice sensor, measures the total impedance and complex dielectric properties of the overlying layer. A self-heated thermistor is also used to determine the thermal conductivity of the contaminant covering the ice sensor subsystem and from the total impedance, complex dielectric property and thermal conductivity values a determination is made whether the overlying layer is ice, rain water, deicing fluid or snow. The local temperature is measured by a second thermistor located near the self-heated thermistor but removed from it by a distance sufficient to isolate it from self-heated thermistor thermal input effects. The physical size of the self-heated thermistor may be varied in order to measure the thermal conductivity value over a greater or smaller volume; the larger the thermistor, the larger the region sensed for thermal conductivity. In another embodiment, several self-heated and local temperature measuring thermistor pairs are used to measure thermal conductivity properties of the contaminant at various heights in the contaminant layer. Again, the outputs of each pair of sensors are used to confirm the type of contaminant. The present invention is designed to work over an extended temperature range from above 0 C to −40 C to include all probable cases of aircraft icing. Various physical arrangements of self-heated thermistor and local temperature measuring thermistor pairs will be discussed later when a detailed description of the preferred embodiment is provided.

All subsystems and support units, including the impedance measurement subsystem, utilize low power consumption, miniaturized electronic chips or components whose vertical dimensions are a few millimeters in height. Because of the miniature size and minimal heights of all elements, they are collocated directly with the ice sensor in a thin, pliant planar patch of diminished area which may be mounted anywhere on the aircraft and which has little effect on the aircraft's drag or flowfield. The present patent offers for the first time a unique design which collocates the ice sensor subsystem physically with the impedance measurement and readout units and all other supporting components. Collocation of all subsystems and supporting units eliminates the long wire and coaxial cable runs between components needed by prior approaches. In the present invention, wire and coaxial cable lengths are measured in distances of a few centimeters or less since all components are collocated together while in prior art patents, external sensors on the aircraft were connected to the rest of the system which had to be mounted far away either internal to the wing or inside the fuselage because of their large physical size. Thus prior patent implementations were required to use wire and coaxial cable runs with lengths from near a meter to fifteen meters or more. Thus collocation as done in the present patent provides significant weight savings because of shorter wire and coaxial cable lengths used and improves the accuracy of the impedance and dielectric measurements because deleterious cable effects are eliminated.

The complex dielectric property subsystem operates continuously in real time and calculates complex dielectric values of the contaminant from the impedance frequency scan data. The complex dielectric property subsystem monitors the dielectric property locus in dielectric space as the excitation frequency is varied from near dc to higher frequencies and compares the measured results for magnitudes and shape with laboratory property data taken at the same temperature and stored in the processor. It double-checks using frequency scanned total impedance data along with the physical and electrical characteristics of the external ice sensor that ice is indeed accreating on the surface and not rain water, deicing fluid or snow. The total impedance scan data is converted to complex dielectric property data using algorithms that take ice sensor subsystem physical and electrical characteristics into account. If the measured results form a semicircular shaped locus of dielectric properties in complex dielectric space during the frequency scan and those measurements are also determined to be in agreement with on-board stored laboratory ice data, ice is confirmed to be present. The presence of ice is also confirmed if a particular vector can be constructed from the measured data taken at a single preselected excitation frequency and found to have a vector angle in agreement with the vector angle formed from stored laboratory results taken at the same measurement conditions. In addition, complex dielectric measurement algorithms identify whether cracks, flaws, or voids or increased electrical conductivity exist in the ice covering the sensor from their effects on the shape and size of the measured complex dielectric locus or from the length of the vector at the pre-selected frequency. A method is provided for correcting ice thickness values which were initially based on the measured total impedance values for crack, flaws or voids or higher electrical conductivity effects should they be found to exist.

It is therefore an objective of the present invention to provide a monitoring and safety system for detecting the onset, presence and thickness of ice on an external aircraft surface in-flight or on the ground.

It is a further objective of the present invention that the monitoring and safety system provide icing data and aural warning signals for the onset and growth of icing conditions simultaneously to the pilot of the manned aircraft or to the ground controller if an unmanned aircraft and also to the aircraft's deicing system, if desired.

It is a further objective that the ice sensor be mounted on the external surface and used to measure the total impedance and complex dielectric properties of the contaminant layer overlying it.

It is a further objective of the present invention that the total impedance of the contaminant layer be measured with a miniature impedance measuring electronic chip which electronically excites the ice sensor and is collocated with it.

It is a further objective of the present invention that the thermal conductivity of the overlying layer be measured with an external surface mounted self-heated thermistor and local temperature measuring thermistor pair collocated with the ice sensor.

It is a further objective of the present invention that the detection of ice onset and its thickness be accomplished using total impedance values, complex dielectric properties and thermal conductivity values from the ice sensor and thermistor pair mounted on the external surface; these measurements also used to discriminate between ice and other possible contaminants overlying the ice sensor such as rain water, deicing fluid, or snow.

According to the present invention, the ice sensor consists of two or more electrodes either in the form of adjacent planar metal plates extending outward from the external surface and facing each other or concentric or interleaved electrodes mounted flush with the external surface. The depth of contaminant building up between the planar electrodes is measured using one or more of a number of existing techniques including, for example, the obscuration of light beams, ultrasound reflection, capacitive measurements or conductivity measurements between opposing metal sensor plates or between vertical segments of the metal sensor plates facing each other. A second preferred embodiment for the ice sensor consists of a surface mounted ice sensor of bullseye shape and form.

It is a further objective of the present invention that the type of ice, glaze or rime, be determined from the measurement of the thermal conductivity of the overlaying layer using a heat transfer method employing a self-heated thermistor and local temperature measuring thermistor pair.

It is a further objective of the present invention that an independent means is provided to confirm that ice and not rain water, deicing fluid, or snow is the type of material building up between the plate electrodes and thus on the aircraft or over the surface mounted, flush bullseye type configuration.

It is a further objective of the present invention that the independent confirmation of ice be provided by electrically exciting the ice sensor and overlaying material using a frequency scan from near dc to 40 kHz frequency or higher while recording total impedance values at selected frequencies in that range along with the local temperature at each frequency point.

It is a further objective of the present invention that a first algorithm convert the measured total impedance data into complex dielectric properties using physical and electrical characteristics of the ice sensor and that a match of that complex dielectric data with a known semicircular signature for ice in dielectric space be used for confirmation that ice is present.

It is a further objective of the present invention is that a separate, simplified means is provided to also confirm that ice is present using a second algorithm to check for a match between the vector angle and vector magnitude calculated from the converted impedance data at the preselected frequency with a similar vector constructed from stored laboratory data for ice. A match between the two vectors provides confirmation that ice is present.

It is a further objective of the present invention that a third algorithm process the newly calculated complex dielectric property data to determine whether the ice overlaying the ice sensor has flaws, cracks or voids in it or higher electrical conductivity than normal ice; factors that might effect ice thickness determination.

It is a further objective of the present invention that a fourth algorithim operate following the discovery of flaws, cracks or voids or higher electrical conductivity in the ice to correct the initial ice thickness prediction based on the initially measured total impedance values for these effects if they are discovered.

It is a further objective of the present invention that the ice sensor system be designed and constructed from newly available, highly accurate, low cost, low profile, miniature electronic chips, electronic components and devices; the selected components having vertical heights in the range of a few millimeters.

It is a further objective of the present invention that all parts, subsystems and subunits of the ice detection system be collocated with the ice sensor in a thin, pliant, planar patch of minimal height and area which does not significantly effect the drag of the aircraft or the aircraft flowfield. Collocation provides substantial savings in sensor system cost and weight along with significant improvements in the accuracy of the measurements of total impedance values because of the reductions in interconnect wire and coaxial cable lengths with associated reductions in cable effects on measured signals.

It is a further objective of the present invention that it performs similar monitoring and safety functions for the detection of ice and its thickness on aircraft on the ground at the gate or while awaiting takeoff and for other applications including roadways, buildings, outdoor power lines, ships and cryogenic storage tanks subjected to icing conditions.

The method for detecting the presence and/or the accreation of ice on the external surfaces of an aircraft and sending this information to the pilot of the aircraft or to the ground controller who is flying the aircraft, if unmanned, is achieved by first measuring the properties of the contaminant layer overlying the ice sensor of the subject invention; using the ice sensor system also mounted on the external surface. The contaminant layer's temperature, thermal conductivity and variation of total impedance versus ice sensor electrical excitation frequency are measured and the total impedance data is also converted to show the complex dielectric properties of the overlying layer. The measured properties and the complex dielectric properties are then used first to differentiate between ice, rain water, deicer fluid or snow overlying the ice sensor and then used to differentiate between glaze and rime ice by comparing the results with laboratory measured ice data stored in computer memory collocated with the ice sensor. The presence of ice is confirmed by a measured thermal conductivity value in agreement with that of ice and also confirmed if its complex dielectric locus exhibits a semicircular shape with values for the diameter of the complex dielectric locus and for its low frequency and high frequency intercepts with the ordinary relative permittivity axis in near agreement with similar results calculated from the stored laboratory measured ice data. A second possible simplified means for confirming the presence of ice is also provided based on demonstrating that the magnitude and angular inclination of a vector from a point on the ordinary relative permittivity axis near the high frequency end of the complex dielectric locus, the vector starting near the locus quarter diameter point on that axis and connecting to a point on the opposite side of the complex dielectric locus corresponding to a preselected frequency of excitation, is essentially equal in magnitude and inclination to a similar vector calculated from the stored laboratory measured ice data. The presence of flaws, cracks or voids or enhanced electrical conductivity are determined from the values for the low frequency and high frequency intercepts and the value for diameter of the complex dielectric locus if these values are found to differ from those calculated for ice based on stored ice data. These differences, if found to exist, are used to correct the initially chosen ice thickness value based on the assumption of normal ice: ice with no flaws, cracks or voids or higher electrical conductivity.

The apparatus for continuously measuring the onset, ice thickness and buildup of ice thickness with time is mounted in a thin, pliable patch of limited vertical height in which all components are collocated. The presence of the patch being such that it does not effect the airflow about the aircraft or the airflow in the vicinity of the patch. The needed property measurements of the overlying layer, including temperature, thermal conductivity and total impedance, are made with low profile electronic chips, components and devices in order to minimize the vertical height of the patch. Two embodiments of the ice sensor are considered: one configuration having two electrically active metal plates, spaced apart and facing each other, with the plates extending outward into the airstream, perpendicular or nearly perpendicular to the aircraft's surface and aligned with the local flow direction, the second ice sensor configuration being a flat bullseye type configuration consisting of a central circular area electrode surrounded by a second ring electrode with radial width; the bullseye sensor having minimal height and attached directly to the surface of the aircraft. All supporting elements of the apparatus are collocated with the ice sensor and constructed from miniature, low power consumption, economical electronic chips, components and devices, all selected to have minimal vertical heights of a few millimeters or less, which allows the apparatus to be assembled in the form of a thin, compliant patch, which when installed externally, matches the shape of the local aircraft's surface and does not effect the airflow about the aircraft or locally effect the airflow passing over the ice sensor. Total impedance measurements in the embodiments are performed with an electronic chip of miniature size collocated with the ice sensor and with the temperature and thermal conductivity measurements carried out using a collocated thermistor pair; glass encapsulated thermistors being preferred.

The features and advantages described herein are not all inclusive and, in particular, many additional features and advantages will be apparent to one of ordinary skill in the art in view of the drawings, specifications, and claims. Moreover, it should be noted that the language used in the specifications has been principally selected for readability and instructional purposes, and not to limit the scope of the inventive subject matter.

DETAILED DESCRIPTION

Figure 1:
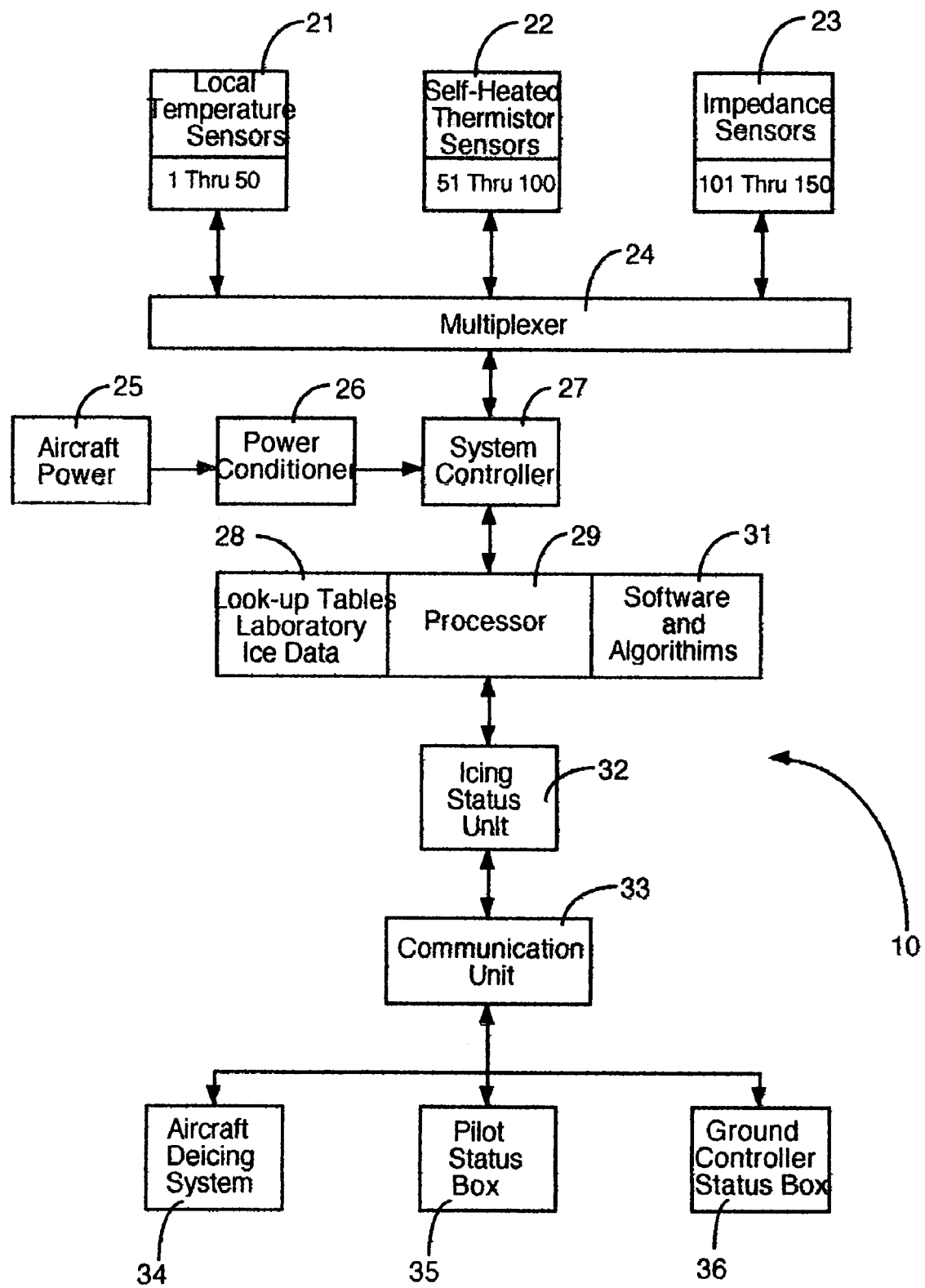
FIG. 1 is an illustrative block diagram of the preferred embodiment of the present invention configured to show the elements comprising the overall system.

Referring now to the drawings and in particular to FIG. 1, the present invention discloses the block diagram 10 which includes local temperature sensors 21, self-heating thermistor sensors 22 for measuring thermal conductivity of the contaminant and impedance sensors 23. Additional elements include a multiplexer 24, system controller 27, and a processor 29 with software and algorithm sections 31 and look-up tables 28 containing laboratory measured properties of ice. The processor and its associated support sections processes the measured data to determine that atmospheric and aircraft surface temperature conditions are appropriate for icing. The processor constantly operates on data in search of the start of contaminant accreation and then discriminates between accreating types of possible contaminants including ice, rain water, deicing fluid, or snow based on the thermal conductivity value measured by the self-heated thermistor along with measured dielectric properties. When ice is discriminated, the processor then determines the type of ice, glaze or rime, that is accreating again from the thermal conductivity magnitude. Other parts of the Ice Detection System of the present invention include an icing status unit 32, communication unit 33 and icing data and warning signals directed to aircraft deicer system 34, if desired, and to an icing status display and aural output box for the pilot 35, or icing status display and aural output box for the ground controller 36. Electrical power is provided to the Ice Detection System from the aircraft power system 25 with further conditioning by the power conditioner unit 26.

Figure 2:
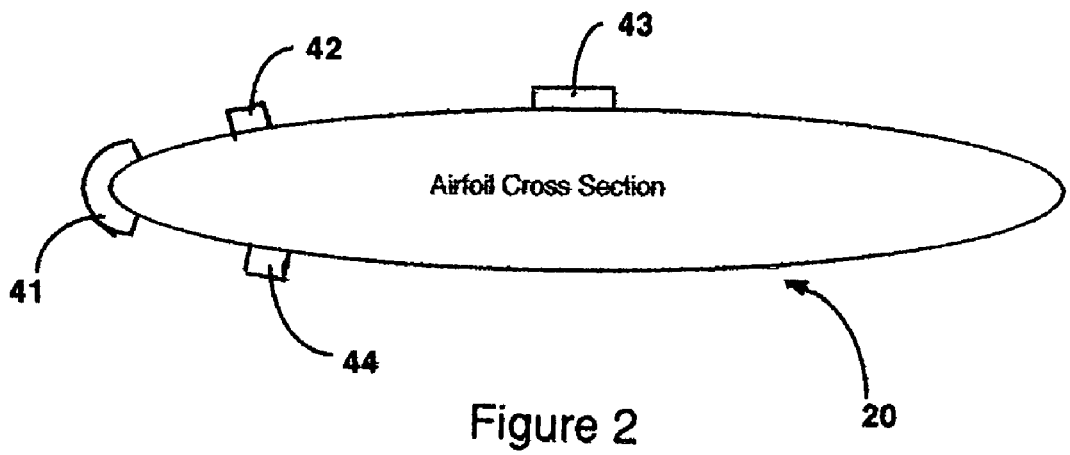
FIG. 2 is a schematic drawing in partial cross-section of an airfoil on which are mounted, at several locations where ice collects in flight, the preferred embodiment of parallel plate ice detector subsystems in accord with the present invention. The physical size of the sensors are exaggerated for visual clarity.
Figure 3:
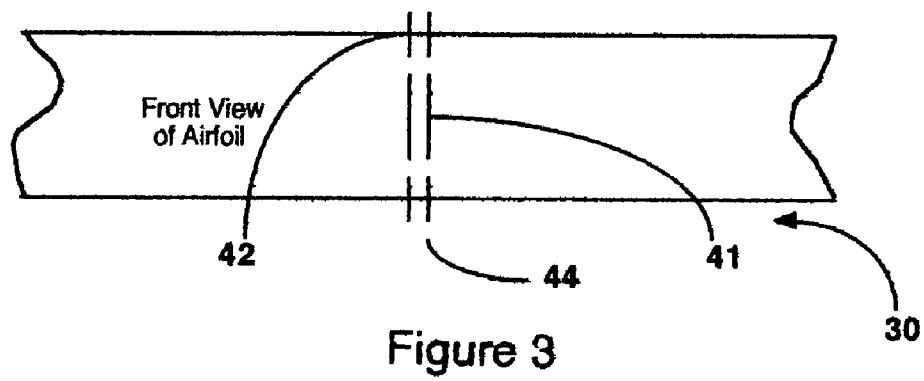
FIG. 3 is a front view of a partial segment of the wing of an aircraft illustrating physical separation between the two parallel plate electrodes forming a parallel plate ice detector subsystem in accord with the present invention.
Figure 4:
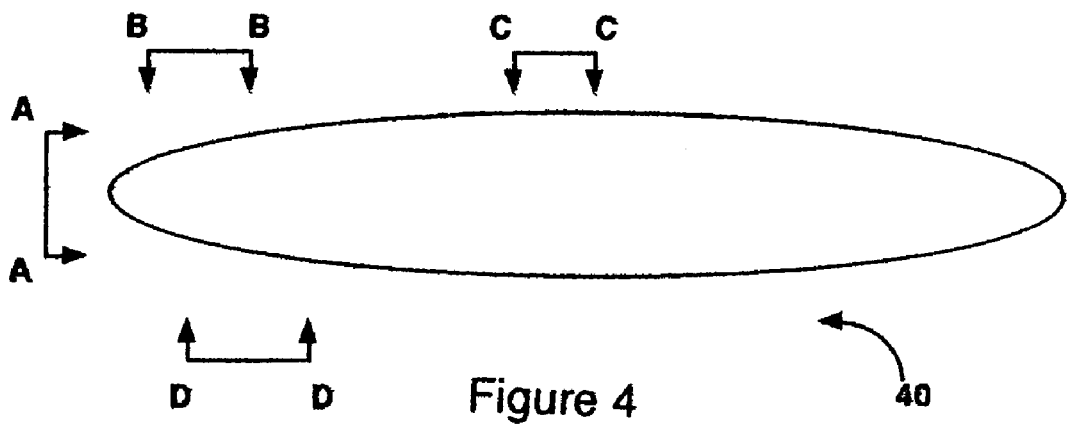
FIG. 4 illustrates possible locations on the partial cross-section of the aircraft wing where a second embodiment of the ice sensor, a surface mounted, flush bullseye ice sensor subsystem, are placed to sense icing in flight in accord with the present invention.

The embodiment for the Ice Detection System ice sensor of the present invention utilizes two parallel plate electrodes, facing each other, and separated by a distance approximately equal to the height of the electrodes. In-flight icing of aircraft has been studied previously through icing tests of wing sections in wind tunnels and by flying aircraft that are to be iced behind a tanker aircraft which releases a spray of water onto the following aircraft under icing conditions. Ice has been found to collect on the leading edges of aircraft wings, horizontal stabilizer and vertical tail and at additional places on the wings upper and lower surfaces. Other possible wing locations for accreation of ice include the chin of the wing airfoil section along with another section of the upper surface near the leading edge and a section of the upper wing surface further back where runback water from electrically heated leading edge deicing units refreezes on its way overboard. FIG. 2, a partial cross-section of an airfoil 20, shows a parallel plate ice detection sensor mounted on the leading edge 41, on the chin 44, on top of the wing near the leading edge 42 and on top of the wing in the runback refreeze area 43. The size of the parallel plate ice detection sensor has been exaggerated in FIG. 2 for visual clarity. Icing also takes place on the engine inlet cowls with possible ingestion of ice into the engine should cowl ice dislodge in flight. An ice sensor of the present invention type may also be installed on the engine cowl. The location of icing varies on different aircraft designs and is a strong function of leading edge sweep, aircraft speed and aircraft angle of attack during flight. Present knowledge of ice location on a particular airframe is not necessarily an exact guide for a different airframe shape. FIG. 3, a frontal view of the wing 30, illustrates the gap that is placed between planar electrode plates for leading edge 41, chin 44, and upper forward wing surface locations 42. FIG. 4, a partial airfoil cross section 40, notes the similar locations, A-A, B-B, C-C and D-D, that are employed for the second, surface mounted, flush bullseye type embodiment of the Ice Detection System ice sensor.

Figure 5:
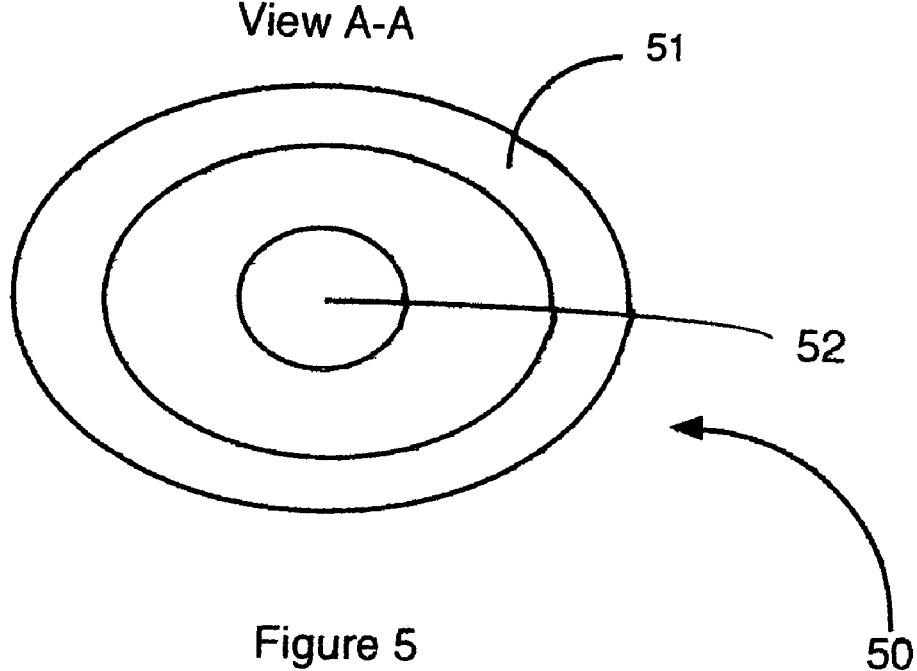
FIG. 5 is a frontal view of the surface mounted bullseye ice sensor symmetrically mounted about the wing leading edge and following the wings curved surface in accord with the present invention.
Figure 6:
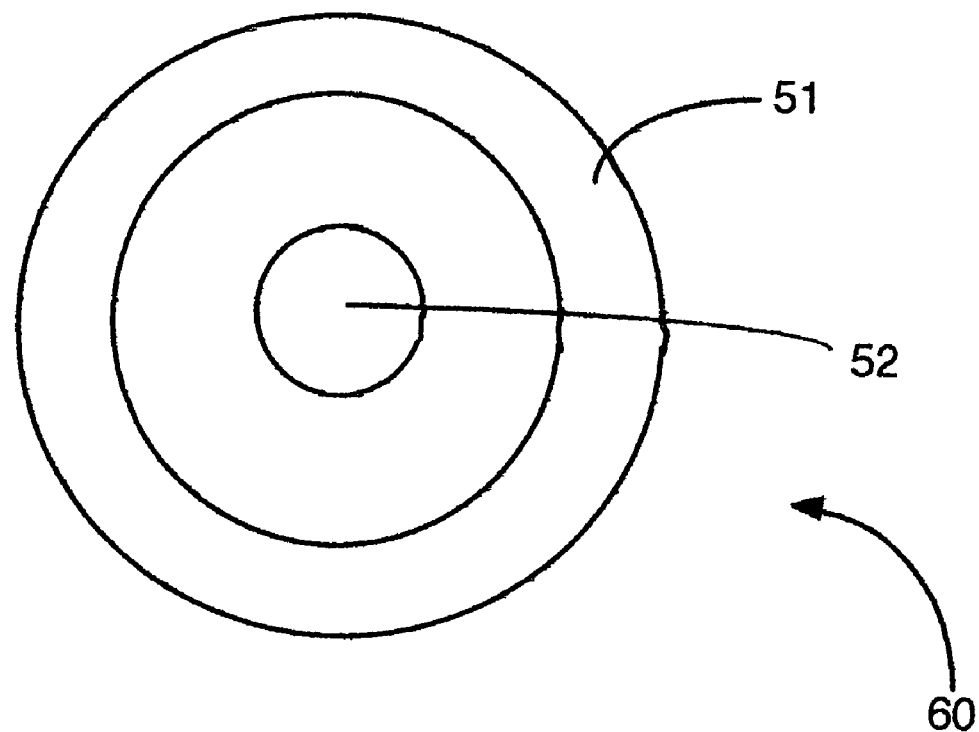
FIG. 6 is a view of the surface mounted bullseye ice sensor as seen undistorted in shape when mounted on a planar or nearly planar surface of the airfoil or other aircraft surface in accord with the present invention.

FIG. 5, view A-A of a bullseye ice detection sensor 50, shows the bullseye sensor symmetrically mounted on the curved leading edge of the wing. A slightly different location may be chosen about the nose of the airfoil section for the sensor in order to compensate for the angle of attack that the aircraft is expected to spend its greatest time flying at. In FIG. 5, the center circular area electrode 52 is surrounded by the outer ring electrode 51. FIG. 6, which illustrates views B-B, C-C, and D-D of a planar bullseye Ice Detection System ice sensor 60, shows a visually symmetrical bullseye sensor geometry when it is placed on a flat or nearly flat aircraft surface. The gap between the central electrode 52 and the circular outer electrode 51 as well as the width of the outer electrode, is selected by considering the maximum depth of the ice to be measured and is normally taken equal to about the diameter of the central electrode for best results. The diameter of the central electrode is also varied with expected operational ice depth to be measured. For monitoring thicker expected ice depths, a larger central electrode is chosen along with a larger gap and a larger outer electrode ring width.

Figure 7:
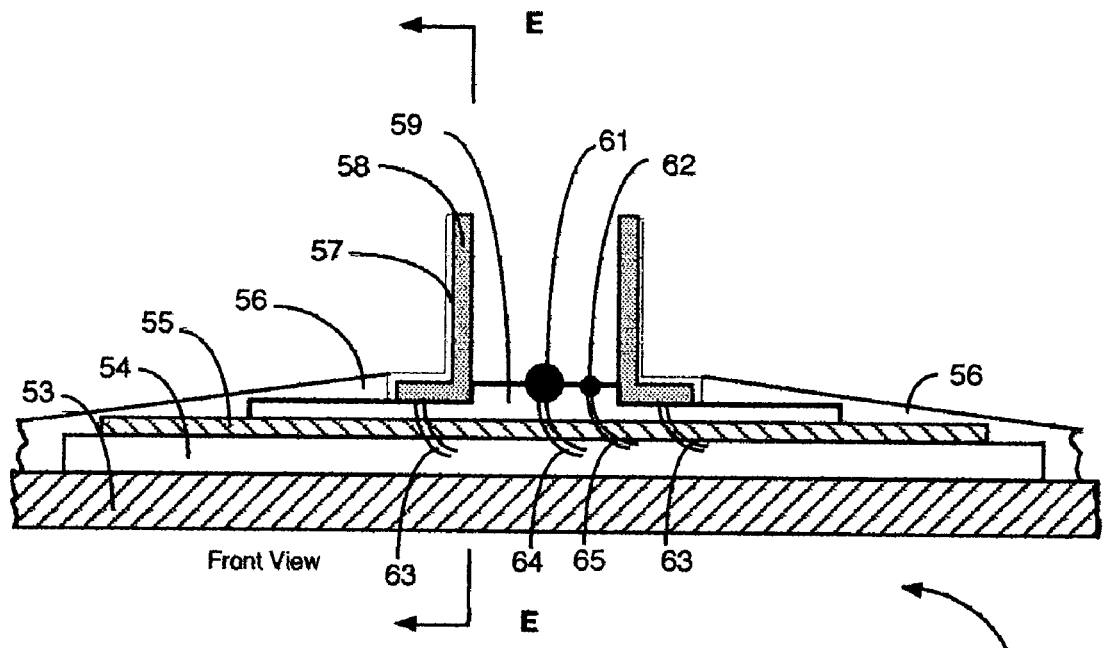
FIG. 7 is a partial cross-section view of the parallel plate ice sensor subsystem showing construction and the preferred placement of the self-heated thermistor and local temperature measurement thermistor pair.

A partial cross-sectional view, FIG. 7, of the parallel plate Ice Detection System ice sensor 70 illustrates how the metal electrodes 58 face each other. Electrodes 58 have a thin insulation coating 57 on their outer surfaces and sit on a slab of insulator 59 which electrically isolates them from each other and from the aircraft's metal or composite wing surface 53. The preferred insulator 59 is Teflon or other electrically non-conducting material with good physical strength. The location of the self-heated thermistor 61, which is used to measure the thermal conductivity of the contaminant forming between the parallel plate electrodes and from that measurement magnitude discriminate the type of contaminant (ice, rain water, deicing fluid or snow) or if ice has been discriminated, the type of ice (glaze or rime) is noted along with the location of the local temperature sensing thermistor 62. Both thermistors are partially buried in the insulation layer 59 with their top hemispheres immersed in the passing flow or overlying contaminant. The local temperature sensing thermistor 62 is physically separated from the self-heated thermistor so it is not exposed to any temperature rise produced by the self-heated thermistor. The typical separation is one centimeter with the local temperature measuring thermistor either placed to the side or upstream from the self-heated thermistor. The self-heated thermistor and the local temperature measuring thermistor 62 are employed in pairs since operation of the self-heated thermistor is predicated on knowing the local temperature. In the preferred embodiment, glass encapsulated thermistors are used. Using the measured local temperature, the system controller 27, FIG. 1, does several things. First, it controls the temperature of the self-heated thermistor 61 and keeps it always below 0 C so no melting of the contaminant occurs should the contaminant be ice or snow. Second, it raises the temperature of the self-heated thermistor only a few tenths of degrees C. above the local temperature to make the thermal conductivity measurement.

Measurement of the thermal conductivity of a material using the self-heated thermistor method is described by J. W. Valvano et al. in "The Simultaneous Measurement of Thermal Conductivity, Thermal Diffusivity and Perfusion in Small Volumes of Tissue", Trans. of ASME, 192, Vol. 106, August 1984. The electrical power required to maintain a fixed temperature difference between the self-heated thermistor and the local temperature is measured and is used to determine the effective thermal conductivity under the assumption that the thermistor is of spherical shape for the purposes of the heat transfer calculation.

The effective thermal conductivity is given by the formula:

$$K_{eff} = \frac{1}{\frac{3\Delta T}{\Gamma a^2} - \frac{1}{5K_b}}$$

Where: delta T is the volume averaged temperature increase, gamma is the steady state power input, a is the radius of the thermistor bead, and K sub b is the thermal conductivity of the self-heated thermistor bead. The spherical thermistor bead radius and the thermal bead conductivity are determined by a calibration technique using different liquids with known thermal properties.

Wires 63 from the electrodes and wires 64 and 65 from the self-heated thermistor 61 and the local temperature measuring thermistor 62, respectively, pass through the guard layer 55 and then run inside the insulation layer 54 to the mutiplexer 24 (not shown). The guard layer 55 cancels stray electromagnetic fields from the electrically excited planar electrodes 58. Insulation layer 54 provides electrical isolation between the guard layer and the aircraft surface. An additional insulating layer 56 is provided to cover the parallel plate ice sensor base and blend it into a thin, streamlined body attached to the external surface. A typical covering material is Neoprene or other electrically nonconducting, pliable material.

After a cycle of contaminant accreation followed by its identification as ice and with the measurement of its thickness completed, the system controller supplies electrical power to deice the planar electrode ice sensor. The electrical power heats the two electrodes, the self-heated thermistor, the local temperature measuring thermistor and the guard layer until the ice sensor is deiced. Indication that the parallel plate ice detection sensor is completely deiced is determined from a capacitive measurement made between the planar plate electrodes and/or a thermal conductivity measurement.

Figure 8:
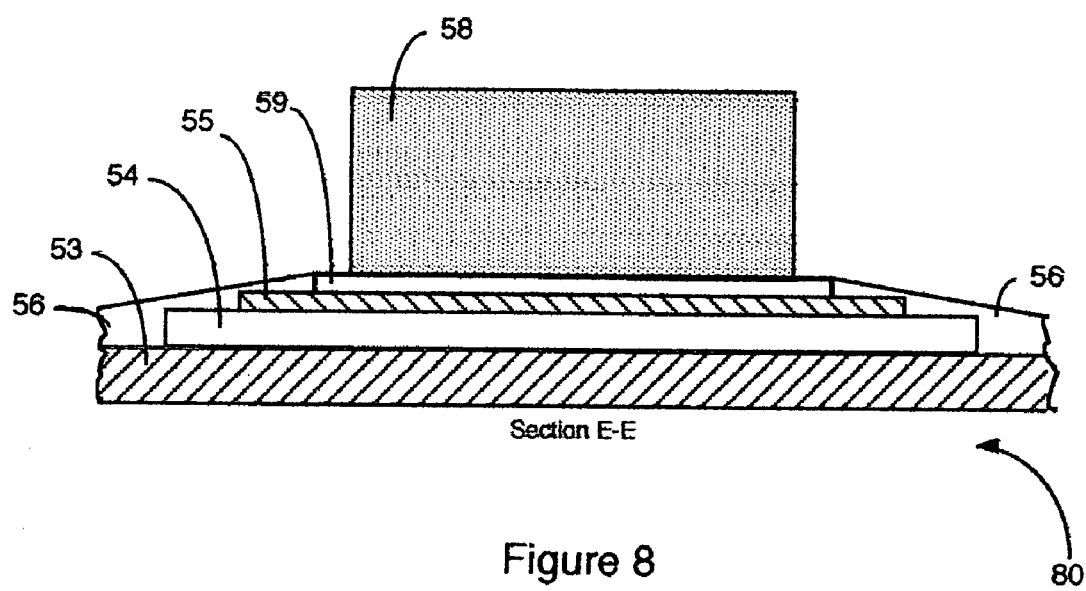
FIG. 8 is a partial cross-section E-E through the parallel plate ice sensor of FIG. 7.
Figure 9:
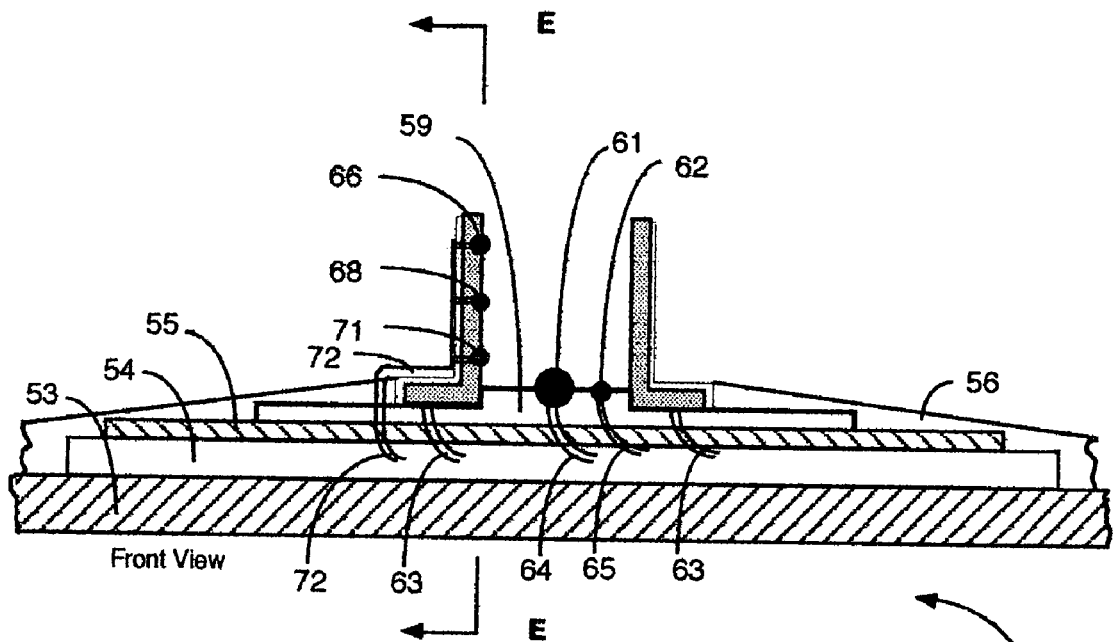
FIG. 9 is a frontal view of a partial cross-section of the parallel plate ice sensor illustrating how additional pairs of self-heated and local temperature thermistors may be arranged vertically to obtain the variation of thermal conductivity and thus variation in type of contaminant, if any.
Figure 10:
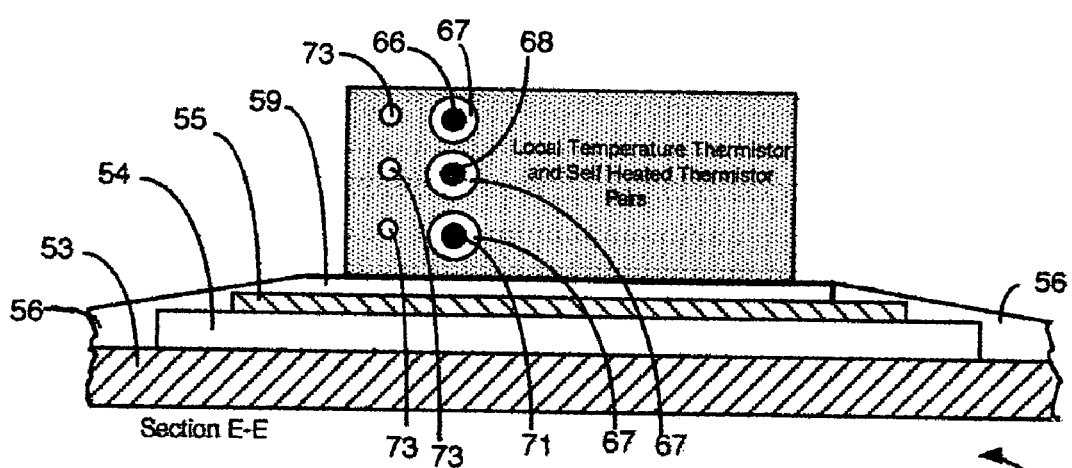
FIG. 10 illustrates how thermal insulation is provided around each of the self-heated thermistors to eliminate heat transfer effects from them reaching the surrounding metal plate.

FIG. 8 is a partial cross-section E-E 80 as indicated in FIG. 7. If it is desired to characterize the contaminant in the vertical direction, in addition to determining what it is at the top surface of insulator 59, this is accomplished by adding several self-heated and local temperature measuring thermistor pairs to the ice sensor in the vertical direction. FIG. 9, a partial cross-section of the parallel plate Ice Detection System ice sensor with several thermistor pairs distributed vertically 90, shows these sensor pairs half submerged in the electrode surface. Wires from self-heated thermistors 61, 66, 68, and 71, labeled 64 and 72 respectively, connect these devices to the multiplexer (not shown) and pass inside insulator layer 54. Wires from the local temperature measuring thermistor 62, labeled 65, also pass through insulator layer 54 on their way to the multiplexer. The self-heated thermistors 66, 68, and 71, shown in the cross-section 100, FIG. 10, are each surrounded by thermal insulation 67 to assure that the heating effect of the self-heated thermistor propagates outward into the contaminant and not into the adjoining planar metal electrode. Wires from self-heated thermistors 66, 68, and 71 and from local temperature measuring thermistors 73 also pass out through insulation layer 54.

Again, each pair of thermistors is used to measure the thermal conductivity and along with the complex dielectric properties of the contaminant, this information is used to discriminate between the types of contaminant: ice, rain water, deicing fluid or snow, and if ice, determine the type ice (glaze or rime) from the thermal conductivity. Pure glaze ice in the temperature range from 0° C. to −40 C has a thermal conductivity value in the range from 2.4 to 2.6 watts per meter degrees K, rain water slightly above 0 C has a value of 0.60 in the same units, air is 0.023, and a 50/50% mixture of deicing fluid is 0.41. The thermal conductivity of low density rime ice that accreats between Mach (M) equals 0.45 to M equals 0.85 was measured in "Experimental Determination of Thermal Conductivity of Low Density Ice", W. D. Coles, NACA Technical Note 3143, March 1954. The density of this type of ice was found to fall in the range from 0.38 grams per cubic centimeter at the low Mach number to 0.50 grams per cubic centimeter at the higher Mach number and have a thermal conductivity in the range from 0.40 to 0.65 watts per meter degrees K over that same range. Thus, the presence of glaze ice is easily determined by the substantial difference in thermal conductivity between it and all other possible contaminants. Dielectric values are used in addition to discriminate between rain water, deicing fluid, and low density rime ice.

Figure 11:
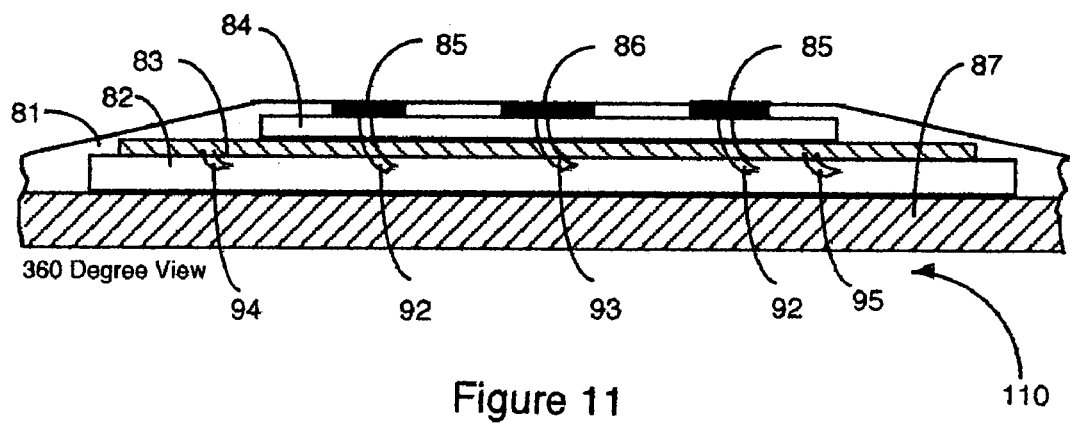
FIG. 11 shows a second embodiment of the ice sensor subsystem employing a planar, pliant ice detector sensor of flush bullseye shape.
Figure 12:
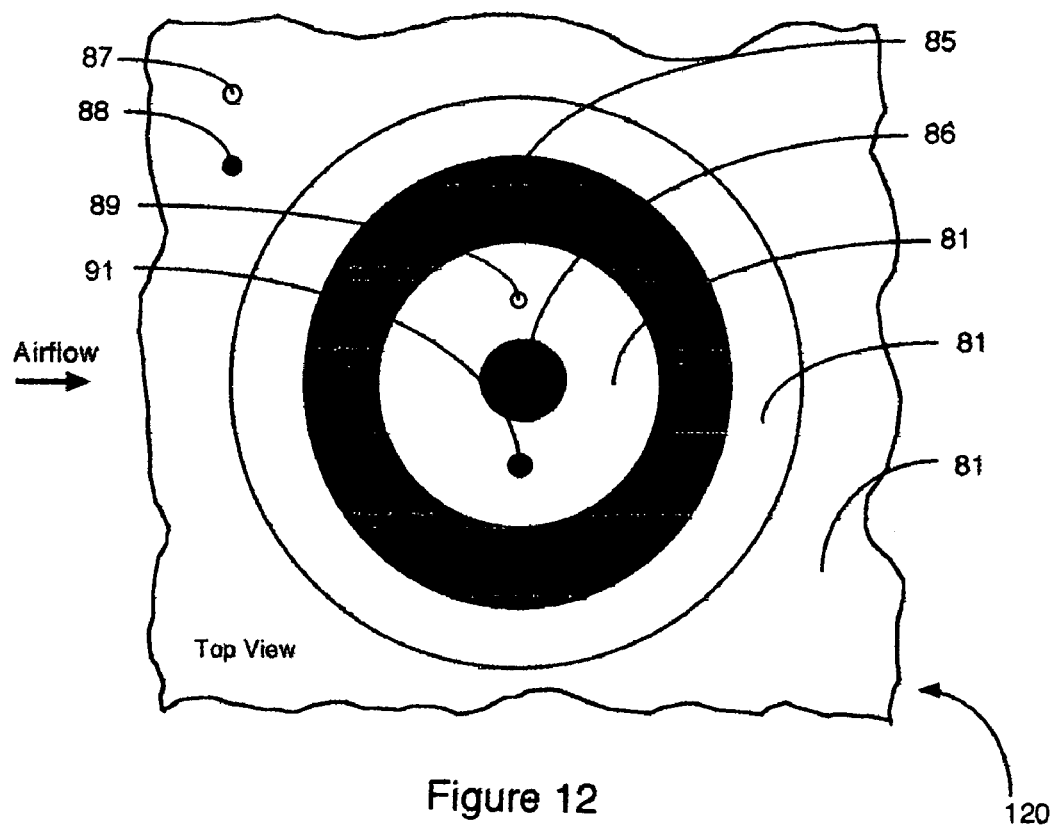
FIG. 12 illustrates a vertical view of the geometry of the surface mounted, flush bullseye ice sensor along with two possible locations for adjacent self-heated and local temperature measuring thermistor pairs placed in the same surface plane.
Figure 13:
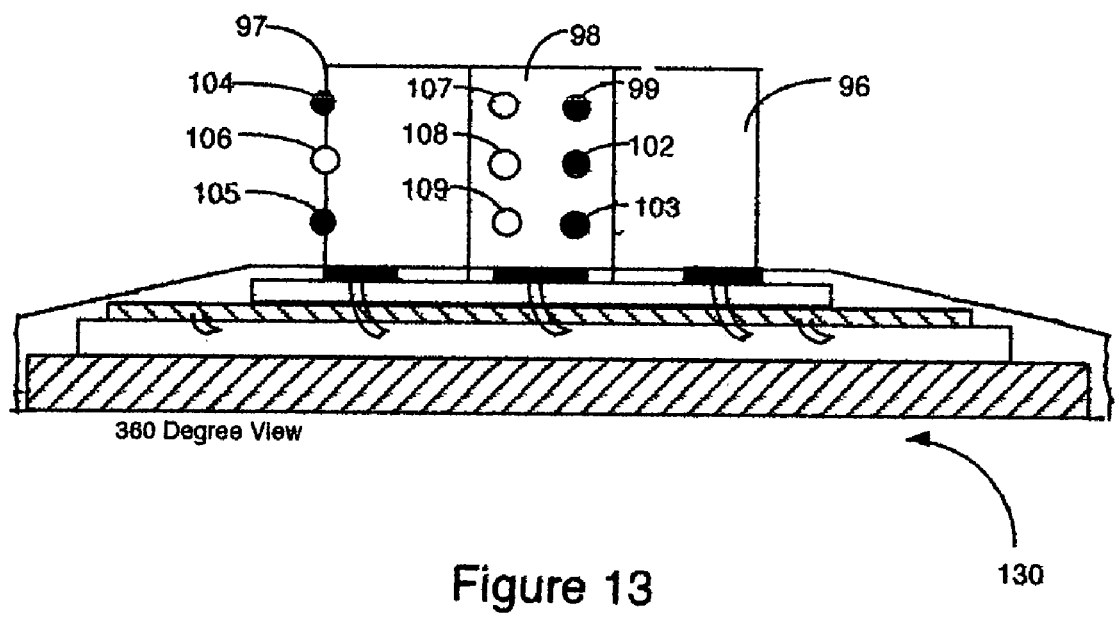
FIG. 13 is a view of a support strut, extending outward from the surface adjacent to the bullseye ice sensor, equipped at several vertical locations with self-heated and local temperature thermistor pairs and used for measuring the vertical variation of the thermal conductivity and thus variation in type of the contaminant, if any.
Figure 14:
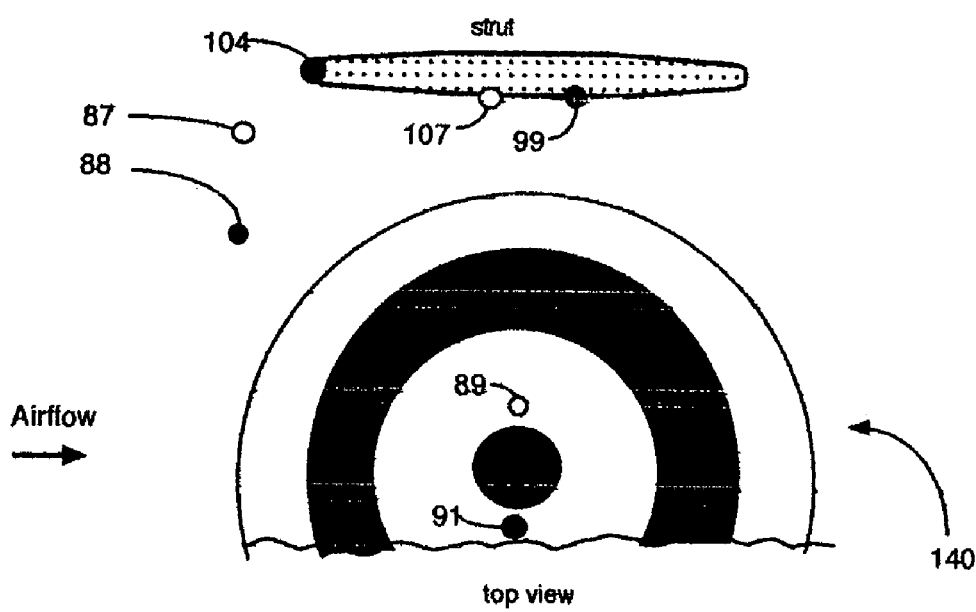
FIG. 14 is a partial top view showing one possible profile for the support strut which contains vertically located self-heated and local temperature sensing thermistor pairs.

FIG. 11, a partial cross-section of a bullseye type Ice Detection System ice sensor 110 has a construction similar to the parallel plate ice sensor with the exception that the metallic electrodes are flush with the upper sensor surface and flush with the aircraft wing surface 87. The metallic bulleye sensor sits on electrical insulator 84 which in turn sits on the metallic guard layer 83 under which is electrical insulator 82 and the aircraft outer wing surface 87. FIG. 12, a view 120 from above the bullseye sensor, shows the concentric positioning of the inner electrode 86 and the outer electrode 85. Also shown in the view 120 are two possible locations for the self-heated and local temperature measuring thermistor pair: 91 and 89 respectively or 88 and 87 respectively. An advantage of the bullseye Ice Detection System ice sensor is that it does not project out into the flow and adds little drag to the aircraft. The bullseye Ice Detector System ice sensor also employs a cyclical deicing mode in which electrical power is supplied simultaneously to the electrodes 85 and 86 as well as to guard layer 83 and to the thermistors to raise their temperatures and melt accumulated ice on the sensor above them. Completion of a proper deicing is declared as before when a specified value is measured for thermal conductivity or a desired capacitance value between the two electrodes is achieved.

To measure the vertical variation of contaminant properties, a thin vertical strut containing self-heated and local temperature measuring thermistor pairs is mounted adjacent to the bullseye ice sensor as noted in FIG. 13, 110 and FIG. 14, 120. Two possible locations are shown for the thermistor pairs in FIG. 13, 110: the leading edge 99 of the strut 96 or on its side 98. In the embodiment, the strut is about four centimeters tall. Though thermistor pairs are shown at only three vertical heights in FIG. 13, 110, placement of a significantly larger number of thermistor pairs is possible both on the leading edge of the strut or on its side. For thermistors placed on the side of the strut, data taken by thermistor pairs at the same vertical height is processed. For thermistors mounted along the leading edge of the stut and with the type of thermistors alternating between self-heating and local temperature measuring thermistors in the vertical direction, the local temperature measured by two thermistors on either side of a self-heated thermistor are averaged and used in data processing. The locations of thermistors pairs, 87 and 88 or 89 and 91, respectively, on the external surface level are maintained when a strut is used, FIG. 14, 120. The strut is also initially aligned into the direction of the external flow in the absence of contamination to minimize added drag and flow field effects attributed to the strut.

Figure 15:
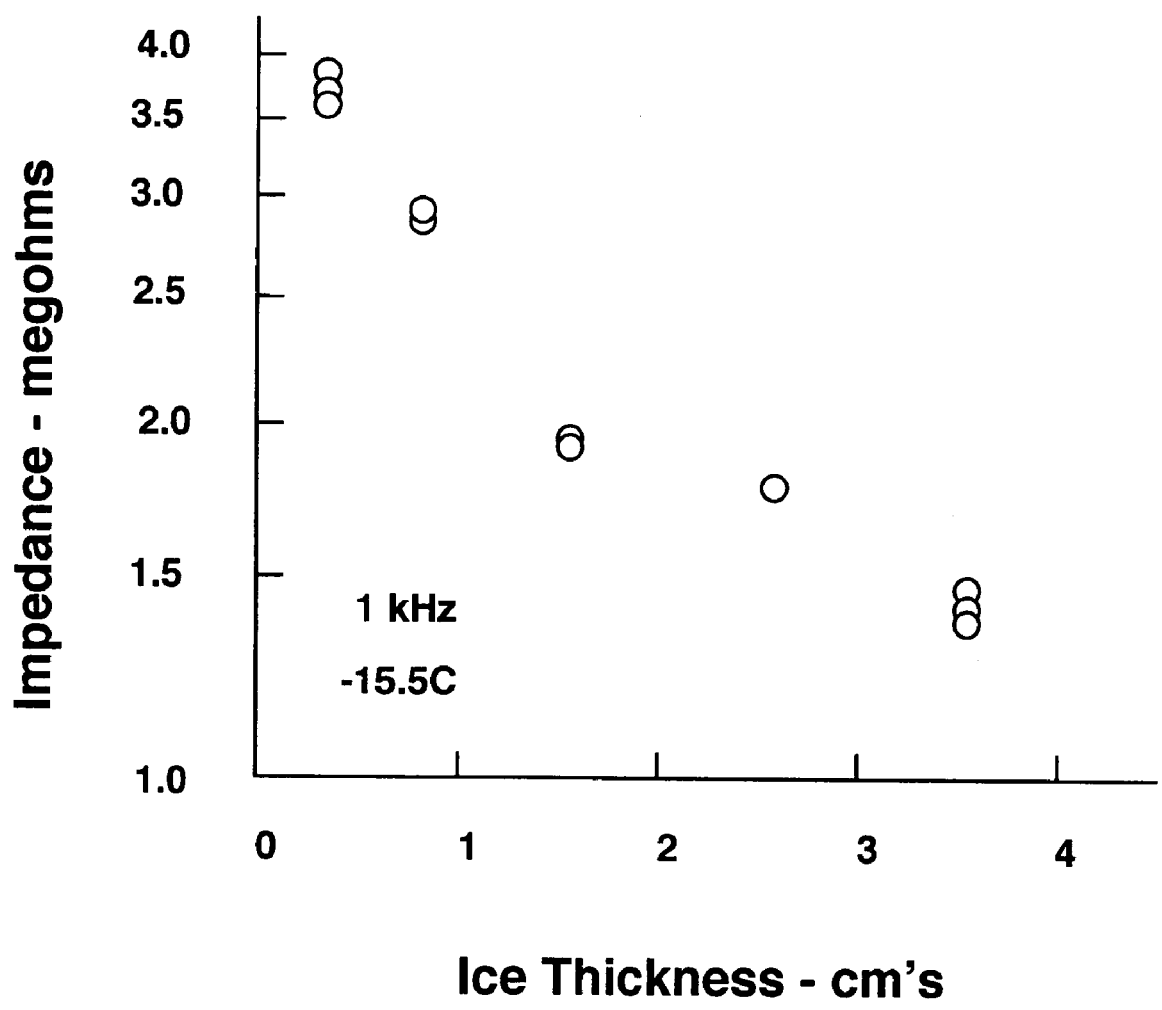
FIG. 15 is a semi-logarithmic plot of total impedance in megohms versus glaze ice thickness in centimeters measured at 1000 Hz and −15.5 C with the flush bullseye ice sensor illustrated in FIG. 12.

The ice detection system carries laboratory data on ice properties in look-up tables as a function of temperature and type of ice, glaze or rime. It also carries data on the properties of other contaminants including rain water, deicing fluid and snow. An example of laboratory measured data that is carried in the look-up table section of the processor is shown in FIG. 15 for glaze ice impedance data measured at a temperature of −15.5 C and at an excitation frequency of 1000 Hz. This data was reported in "Aircraft Ice Detection Method", by Jarvinen, P., AIAA Paper 2007-0689, Proceedings of the 45th Aerospace Sciences Meeting and Exhibit, 8-11 Jan. 2007, Reno, Nev. Impedance values are graphed for pure glaze ice lying over a bullseye sensor for ice thicknesses up to four centimeters in FIG. 15. At 1000 Hz, measured impedance values are in the range from 1 megohm to 4 megohms with the impedance values decreasing as ice thickness increases. For comparison, the impedance value of the bullseye sensor at 1000 Hz when covered with rain water was measured to be in the range from 5 to 7 kilohms between 25 C and 0 C while the impedance measured on a dry bullseye sensor at 1000 Hz was in the range from 8.2 to 7.9 megohms between 25 C and −15.5 C. The bullseye ice sensor configuration is seen to have impedance values which are sharply different than those produced by rain water over the sensor and sharply different than dry sensor values. The difference in measured impedance between the sensor covered by ice, rain water, deicing fluid, and air eliminates any possible confusion when the sensor is flown in these four different environments. In operation, the Ice Detection System, knowing the type of ice from impedance, thermal conductivity and/or dielectric measurements, then takes the measured impedance value and converts it to a thickness after interpolation to the measured local temperature should that temperature not be an exact temperature match with the look-up data. The bullseye ice sensor also has a desirable characteristic in terms of detecting the onset of icing for it exhibits high impedance values for small thicknesses of ice.

The embodiment for the impedance measurement device is an Analog Devices Model AD5933, "1MSPS, 12-Bit Impedance Converter, Network Analyzer AD5933" chip. The AD5933 chip is a high precision impedance converter system solution which uses an on-board frequency generator to excite an external complex impedance, in the present invention this is the contaminant overlying the external ice sensor, with known frequencies. The response signal from the impedance is sampled by the on-board analog-to-digital converter (ADC) and a discrete Fourier transform (DFT) is processed by an on-board DSP engine. The DFT algorithm returns a real (R) and imaginary (I) data-word at each output frequency. The magnitude of the impedance and relative phase of the impedance at each frequency point along the sweep is calculated with the total magnitude equal to the square root of the sum of the squares of R and I and the tangent of the phase angle, the ratio of I to R. The capacitance is calculated as the cosine of the phase angle times the total impedance value for cases where system inductance is minimized.

The AD5933 chip measures total impedance magnitudes over the range from 100 ohms to 10 megohms with a total system accuracy of 0.5%. The AD5933 chip permits the user to perform a frequency sweep with user-defined start frequency, frequency resolution and number of frequency points in the sweep. The chip may be programmed to stop at up to 511 frequency points during the sweep and measure the total impedance and phase angle at each point. The sweep frequency range of the chip normally covers the range from 1 kHz to 100 kHz. However by adding a clock-dividing circuit as explained in Analog Devices Application Note AN-843 entitled "Measuring a Loudspeaker Impedance Profile Using the AD5933", the frequency band of interest can be lowered and in that note, it was lowered to the range from 10 Hz to 20 kHz. For the present invention, the desired frequency scan range is from 40 Hz to 40 kHz using the AD 5933 chip and such a range is achievable using the technique just described.

The frequency resolution of the AD5933 chip is 27 bits (less than 0.1 Hz). It comes with its own microcontroller, internal system clock and internal temperature sensor. The AD5933 provides an internal clock with a typical frequency of 16.776 MHz by means of an on chip oscillator. The internal temperature sensor is a 13-bit digital sensor with the 14th bit as a sign bit. The on-chip temperature sensor allows an accurate measurement of the chips temperature to be made with an accuracy of plus or minus 2 degrees centigrade. The AD5933 chip measures 6.2 mm W×7.8 mm D×2.0 mm H and costs, in 2007, $6.95 each in volumes of one thousand pieces. Presently, single units cost $30. It may be powered by a power supply producing voltage in the range from 2.7 V to 5.5 V and current draw is 10 mA (Min) to 25 mA (Max) depending on whether it is operating in the Standby Mode or Normal Mode.

The method for converting from total impedance scan data to complex dielectric property data follows the approach described in "Ice Physics" by P. V. Hobbs, Clarendon Press, Oxford, 1974, pages 82 thru 87, for the case of ice between two parallel electrode plates. The equivalent electric circuit for ice has a capacitance C sub 1 and resistance R sub 1 in series plus a resistance R sub 0 in parallel with them and a separate capacitance C sub infinity also in parallel with them.

The impedance of the circuit in relation to the circuit parameters is given by:

$$\frac{1}{Z_c} = \frac{1}{R_1 + \frac{1}{i\omega C_1}} + i\omega C_\infty.$$

Complex dielectric properties are related to circuit parameters, using relationships between potential difference, ice thickness, and electric field, along with Gauss's theorem and the capacitance relationship between charge and potential difference for a parallel plate capacitor, by the formula:

$$\varepsilon = \frac{LC_1}{\varepsilon_0 A(1+i\omega\tau)} + \frac{LC_\infty}{\varepsilon_0 A}$$

where L is the thickness of the ice, A is the surface area of one of the electrodes, tau is the dielectric relaxation time equal to R sub 1×C sub 1 and omega is 2 pi times the frequency. This equation may be rewritten in the form of the Debye dispersion formula:

$$\varepsilon = \varepsilon_\infty + \frac{\varepsilon_s - \varepsilon_\infty}{1+i\omega\tau} = \varepsilon' - i\varepsilon''$$

where:

$$\varepsilon_s = \frac{L}{\varepsilon_0 A}(C_1 + C_\infty)$$

$$\varepsilon_\infty = \frac{LC_\infty}{\varepsilon_0 A},$$

$$\varepsilon' = \varepsilon_\infty + \frac{\varepsilon_s - \varepsilon_\infty}{1+\omega^2\tau^2} = \frac{L}{\varepsilon_0 A}\left(\frac{C_1}{1+\omega^2\tau^2} + C_\infty\right)$$

$$\varepsilon'' = \frac{(\varepsilon_s - \varepsilon_\infty)\omega\tau}{1+\omega^2\tau^2} = \frac{L}{\varepsilon_0 A}\frac{(\omega\tau C_1)}{(1+\omega^2\tau^2)}.$$

Epsilon prime is the ordinary relative permittivity of ice and epsilon double prime is the dielectric loss factor for ice. Epsilon sub s is the zero frequency or static relative permittivity and epsilon sub infinity is the high frequency relative permittivity; epsilon prime minus epsilon sub infinity is the dispersion.

By eliminating the product omega times tau from the equations for epsilon prime and epsilon double prime, the following relationship is realized which is the equation for a displaced semicircle in epsilon prime/epsilon double prime dielectric space:

$$\left(\varepsilon' - \frac{\varepsilon_s + \varepsilon_\infty}{2}\right)^2 + \varepsilon''^2 = \left(\frac{\varepsilon_s - \varepsilon_\infty}{2}\right)^2$$

Figure 16:
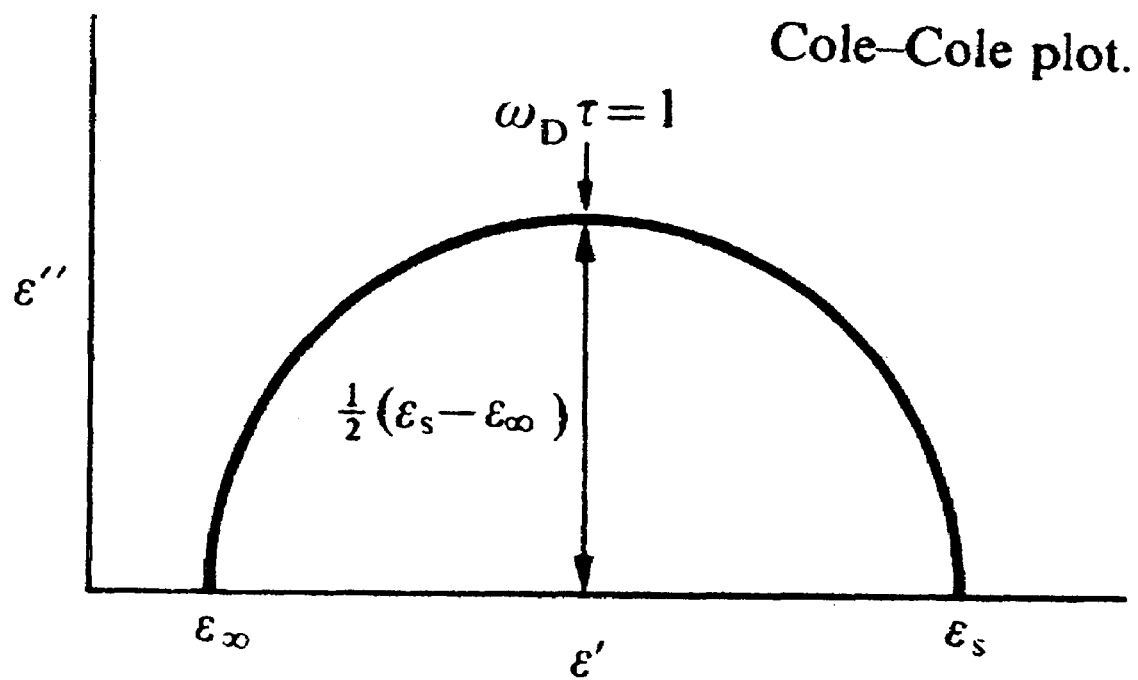
FIG. 16 shows the signature of ice in complex dielectric space: a characteristic semicircular shape as excitation frequency changes from dc to high frequency.

FIG. 16 illustrates the signature of ice in dielectric space: a characteristic semicircular shape. Such a shape in dielectric space is known as a Cole-Cole plot and is the signature for ice. Epsilon prime and epsilon double prime depend on two parameters, the frequency omega and the temperature T. The frequency dependence is expressed explicitly but the temperature dependence appears only implicitly through the difference of epsilon sub s minus epsilon sub infinity and tau sub D, both of which are temperature dependent.

Figure 17:
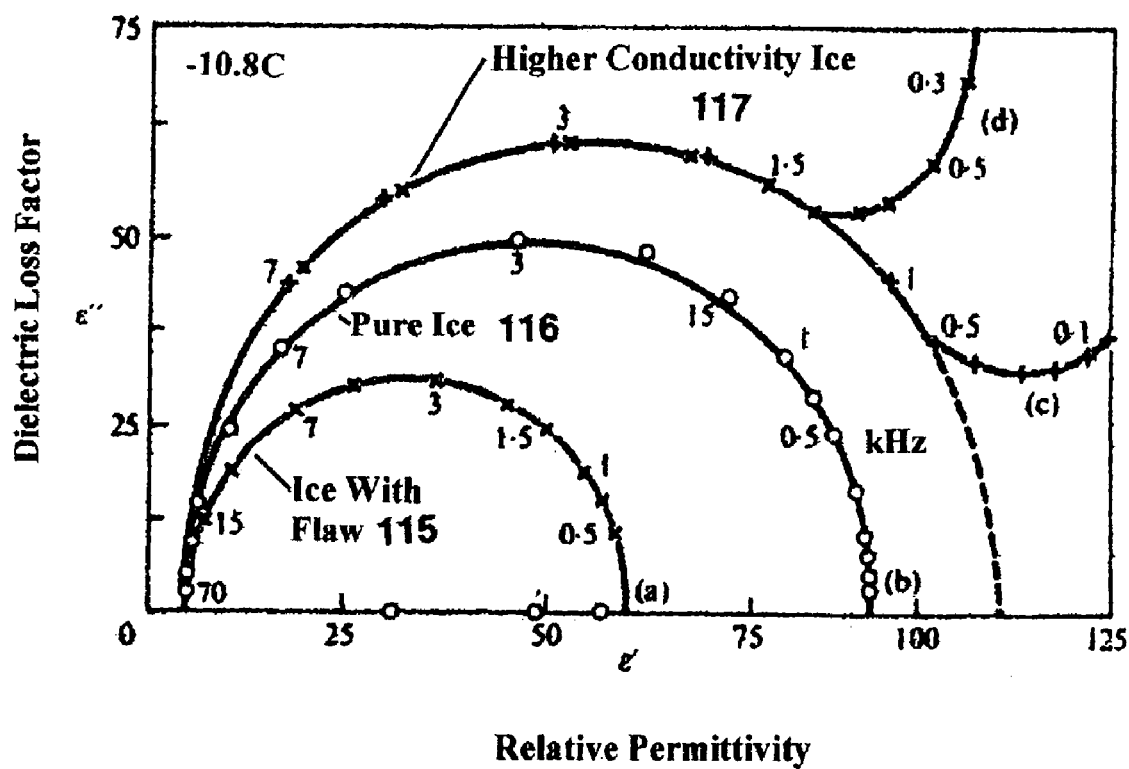
FIG. 17 is a reproduction of the laboratory measured complex dielectric properties with changing excitation frequency, Cole-Cole plots, for pure glaze ice by R. P. Auty in 1951. Also shown are Cole-Cole plots for glaze ice with flaws and glaze ice with higher electrical conductivity.

Laboratory experiments were carried out by R. P. Auty in 1951 for his PhD thesis entitled "Dielectric Constants of Solid H2O and D2O" which obtained data in agreement with the equations listed above and with the Cole-Cole shape illustrated in FIG. 17. Three cases are shown in FIG. 17 for laboratory data measured at −10.8 C by R. P. Auty. The middle curve 116 illustrates the complex dielectric property variation for pure glaze ice while the smaller semicircle shape 115 on the left, represents glaze ice with a flaw parallel to the electrode plates and covering approximately half the area of the electrode. The larger semicircle 117 to the right represents glaze ice with significantly higher electrical conductivity. The important feature to be noted here is that ice, in all cases shown, exhibits a characteristic semicircular shape, though of different size, whether the ice is pure ice, ice with flaws, or ice with higher electrical conductivity. Important values to be noted for the complex dielectric properties of pure glaze ice include the values of epsilon prime at zero and infinite frequencies, 95.0 and 3.08 respectively at −10.8 C. These values vary only slightly with temperature becoming 98.5 and 3.0 at −37.6 C, so the semicircular form for glaze ice remains nearly the same diameter over the temperature band of interest. Auty's thesis also includes data measured at −1.5 C, −16.3 C, −27.5 C, −37.6 C and −50.6 C and because of the plethora of data in that document, that data has been selected for use in the present invention as the lookup tables for pure glaze ice. Similar data is stored in the processor for rime ice, rain water, deicing fluid and snow to allow different types of contaminants to be discriminated from one another using a combination of dielectric data, thermal conductivity data, and impedance data. In order to solve the equations provided above for epsilon prime and epsilon double prime, the value of tau sub D, the Debye relaxation time, must be known. R. P. Auty measured this parameter in his thesis and found that tau sub D was a strong function of temperature: changing dramatically as the temperature is lowered; for instance from 2.5×10 to the minus 5 seconds at −1.5 C to 5.6×10 to the minus 3 seconds at −50.6 C. R. P. Auty's data for tau sub D is selected for use in the present invention and stored in a look-up table in the processor for use in calculations of epsilon prime and epsilon double prime.

Figure 18:
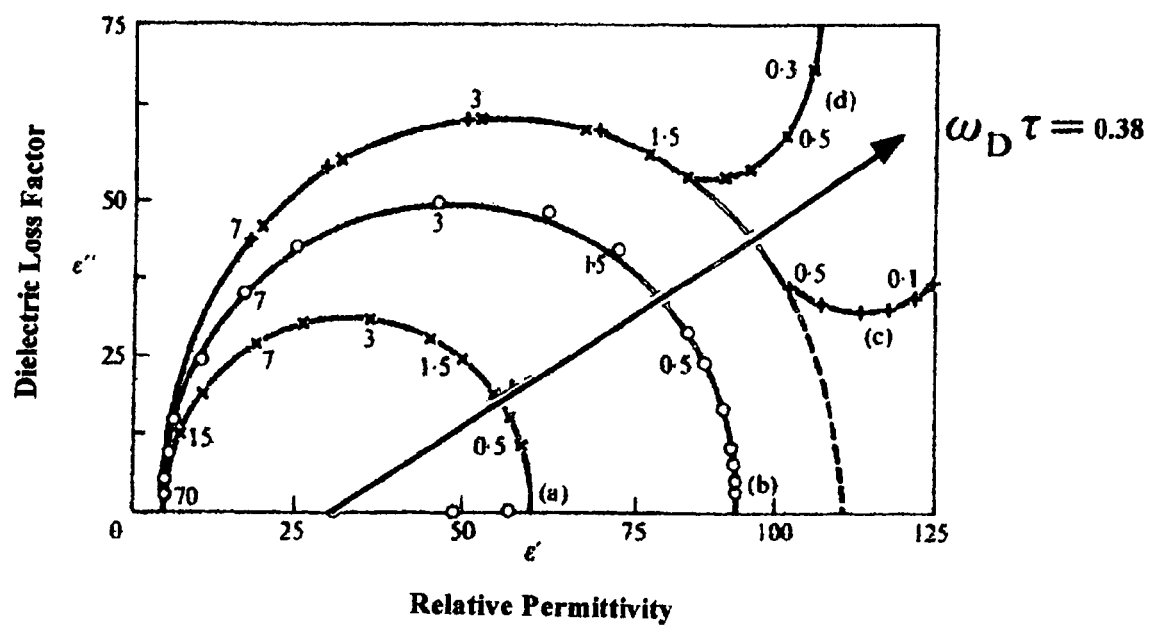
FIG. 18 illustrates a vector passing through the 1000 Hz frequency points at −10.8 C for pure ice, ice with faults, and ice with higher electrical conductivity.

FIG. 18 illustrates how a single, common vector originating on the epsilon prime axis at the quarter diameter point of the semicircular locus may be passed thru the 1000 Hz frequency points on all three complex dielectric loci measured by R. P. Auty at −10.8 C for pure glaze ice and ice with cracks, flaws or voids or higher electrical conductivity This vector makes an angle of 28.5 degrees with respect to the epsilon prime axis and remains at this angle if the product of omega times tau sub D is taken to have the same value at any other temperature as it had at −10.8 C. If the ice temperature is lowered, tau sub D increases as mentioned above. Therefore, the product of omega times tau sub D remains constant only if the excitation frequency and thus omega is lowered. At −40 C, a vector constructed in the same manner would have the same angle if the measurement frequency was chosen to be at a reduced frequency of 45 Hz. This property of constant vector angle is incorporated in the present invention for it allows a simplified method to be used to confirm that ice is present. Rather than making a full frequency sweep and confirming a semicircular locus shape of correct size to establish ice as the contaminant, it is possible to simply monitor the magnitude of the vector angle to ascertain that the contaminant is ice and monitor the angle and length of the vector to ascertain whether pure ice, ice with cracks, flaws or voids, or ice with increased electrical conductivity is present. If the angle remains constant, then ice is confirmed. If the angle remains the same but the length is either smaller or larger than that for pure ice, cracks, flaws or voids are present if the magnitude is smaller or higher electrical conductivity is present if the magnitude is larger. This is the first time that the semicircular shape in complex dielectric space or the constantcy of a vector angle in complex dielectric space has been recognized as a means for detecting ice or discriminating between ice, rain water, deicing fluid or snow.

Figure 19:
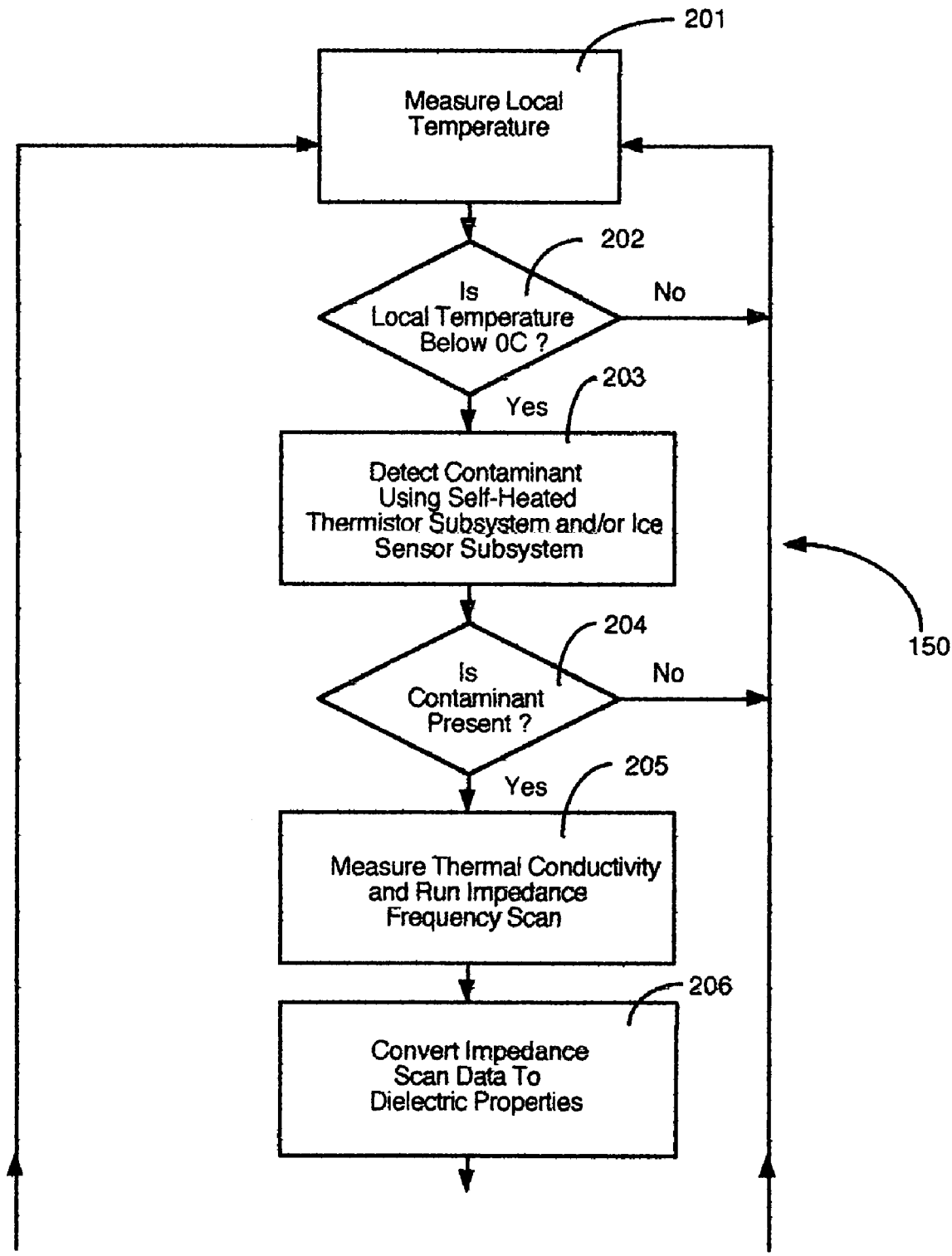
FIGS. 19a-19c shows a flow diagram illustrating the steps that are followed by the present invention as it proceeds thru a cycle from detection of ice accreation to independent confirmation that the contaminant is ice.
Figure 19:
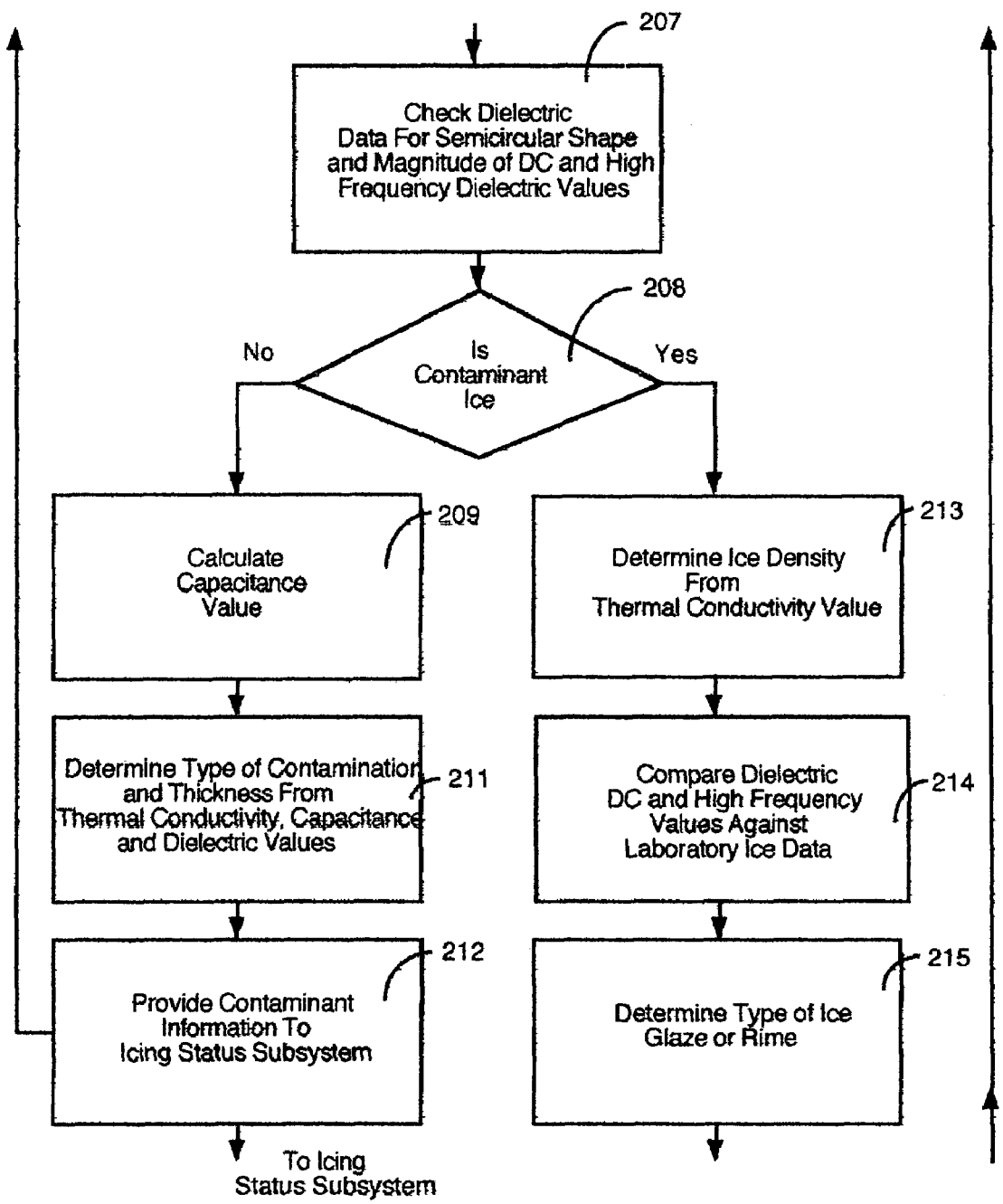
Figure 19:
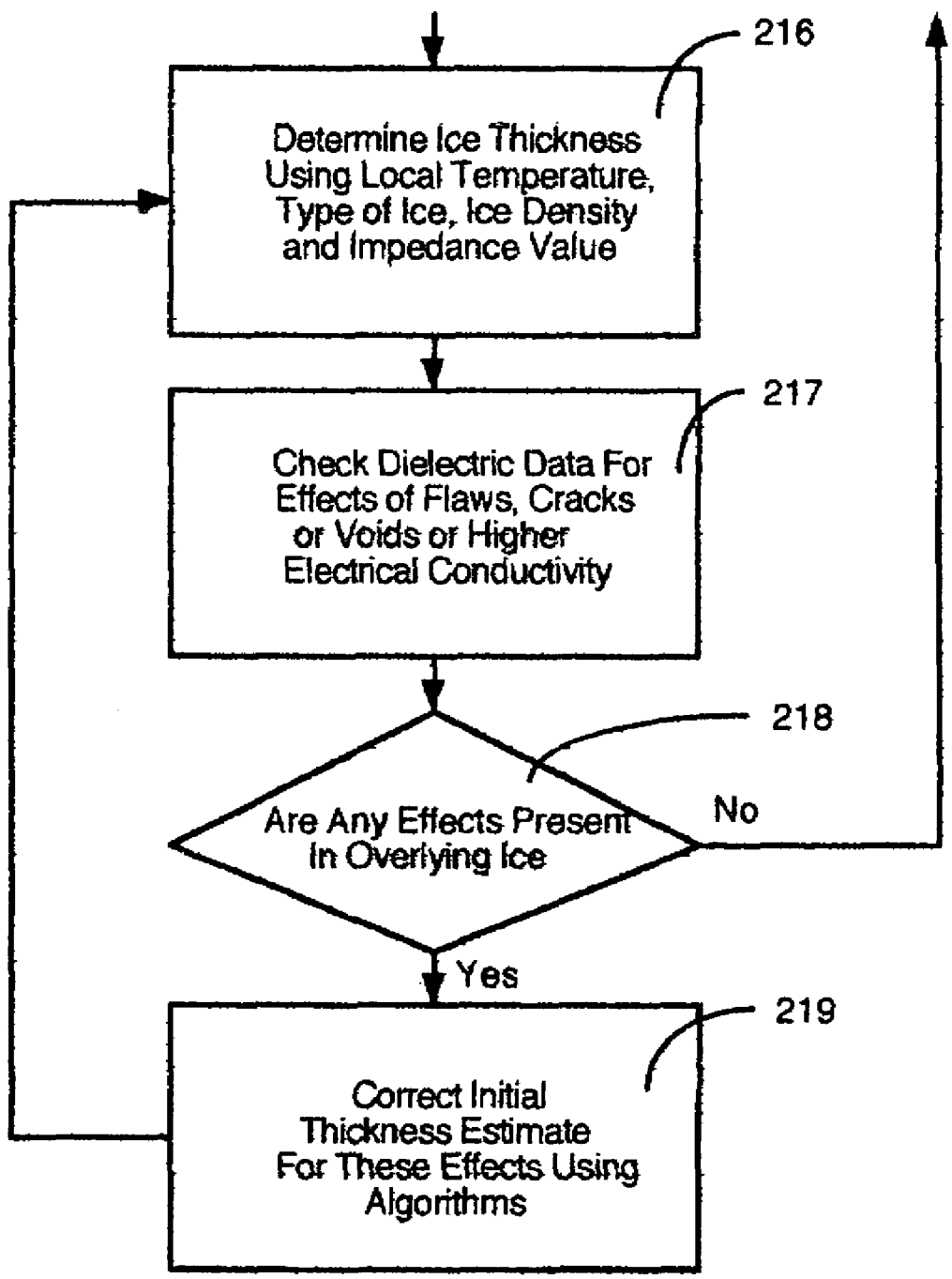
Figure 20:
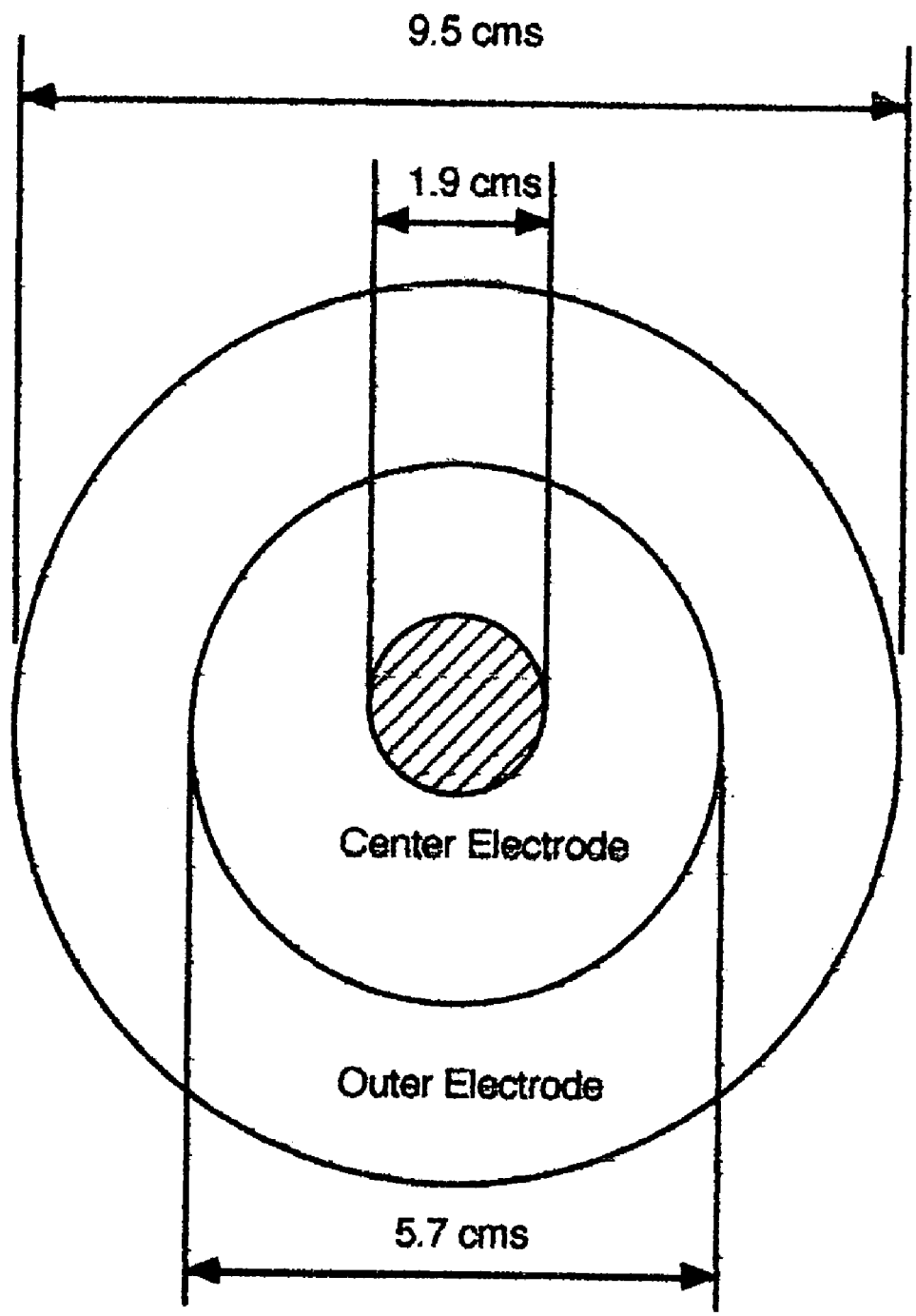
FIG. 20 provides the dimensions of the flush bulleye shaped ice sensor used previously to measure glaze ice thickness versus total impedance at frequencies of 100 Hz, 120 Hz, 1000 Hz, and 10,000 Hz.

FIGS. 19a, 19b and 19c comprise a flow chart 150 illustrating how the Ice Detection System makes its measurements and processes them to detect the onset of icing, determine ice thickness, discriminate between ice, rain water, deicing fluid or snow, determine whether the ice is glaze or rime and perform an independent check based on dielectric properties to confirm that the overlying contaminant is ice. The first step, FIG. 19a, is to make a measurement of the local temperature 201 using the local temperature measuring thermistor or equivalent device. The temperature is checked to see if it is below 0 C 202 to confirm that freezing conditions are present and that icing is possible. If it is not below 0 C, the system recycles and measures the local temperature again and again. If the temperature is below 0 C, the system continues on to determine whether a contaminant is present as detected by the thermal conductivity measurement 203 and/or by a ice sensor subsystem measurement 203. If there is no contaminant present, the system recycles to a measurement of the local temperature 201. If a contaminant is found to be present 204, the system continues on and makes a thermal conductivity measurement 205 for the layer overlying the ice sensor as well as running an impedance scan 205 for the layer using the miniature impedance measuring chip collocated with the ice sensor. The system also converts the impedance scan data to complex dielectric properties 206 of the layer. The next step, FIG. 19b, is to analyze the complex dielectric data 207 to determine whether it exhibits the semicircular locus of data points characteristic of ice or not and whether the dc and high frequency ordinary relative permittivity magnitudes, epsilon prime, also match those for ice. At this point a decision is made whether the contaminant 208 is ice or not. If the answer is no, values for the capacitance 209 are calculated from the impedance data and the type of contaminant 211 and its thickness 211 are determined from data stored in the processor. This result 212 is passed on to the icing status subsystem. If the contaminant is determined to be ice 208, its thermal conductivity value provides the type of ice, glaze or rime 215 and also provides a value for the density of the ice 213. An initial thickness of the ice 216 is then determined, FIG. 19c, from a knowledge of the local temperature, the type of ice, and impedance value measured at a specific frequency. Data is then processed to see if flaws, voids or cracks or higher electrical conductivity 217 are present and if such effects are found 218, the initial value for the thickness of ice is corrected 219 for these effects based on laboratory measured results taken under the same conditions. The initial estimate of ice thickness 216 is updated and the new results are passed on to icing status unit 32 (not shown). Data from multiple ice sensor locations for ice thickness and ice density may be mapped additionally on the pilot or ground controller displays and used to illustrate build up with time of ice on the aircraft. This data may also be combined to provide a more accurate and refined estimate for the weight penalty due to ice build up. FIG. 20 is a drawing of the bullseye ice sensor used by P. Jarvinen to measure the impedance versus thickness data illustrated in FIG. 15. This bullseye ice sensor has an inner electrode of circular area with a diameter of 1.9 centimeters and an outer ring electrode with 5.7 centimeter inner and 9.5 centimeter outer diameters.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

I claim:

1. An aircraft ice detection system employing an external, surface mounted ice sensor unit with at least two ice sensor embodiments to measure the temperature, thermal conductivity and total impedance properties of a contaminant layer overlying the ice sensor, with a thermal conductivity measured with a self-heated device and a total impedance properties measured by a collocated, miniature electronic chip that electrically excites the ice sensor over a range of test frequencies; an Analog Devices AD5933 chip used in the embodiment, and with a collocated computer having a data storage unit and a processor; said data storage unit containing laboratory measured ice data, contaminant properties and ice sensor measured data, said processor containing dedicated software and algorithms for processing ice sensor data to derive complex dielectric properties and a locus of a contaminant in complex dielectric space, for discriminating between ice, rain water, deicer fluid and snow and subsequently between glaze ice or rime ice overlying said ice sensor and for choosing an initial value for ice thickness, said software and algorithms also checking the icing data for signs of cracks, flaws and voids or higher electrical conductivity in said ice based on the size and the shape of said complex dielectric locus and correcting said initial ice thickness value for these effects if found, with said software and algorithms calculating the ice distribution and associated ice weight over said aircraft with said icing data along with aural warning signals transmitted to a pilot of said aircraft and to dedicated displays and to a ground controller and to dedicated displays if said aircraft is unmanned, with said ice detection system using a method to carry out ice detection and discrimination comprising:

means for exciting said ice layer on said surface of said aircraft using said external surface mounted ice sensor which underlies and is immersed in said contaminant layer by driving said ice sensor thru said frequency scan at a given input voltage, means for using said ice sensor in at least two different embodiments; one embodiment employing two separated parallel plates, facing each other and extending out essentially perpendicular to the aircraft's surface and the other embodiment employing a thin, flat ice sensor of bullseye form mounted directly on the aircraft's external surface, means for measuring, storing and processing said total impedance data of said ice layer over said frequency scan from near zero frequency to high frequency using said miniature impedance measuring electronic chip collocated with said ice sensor, means for measuring said thermal conductivity of said contaminant layer overlying said ice sensor using said self-heated device collocated with said ice sensor, means for converting said total impedance measurements to said complex dielectric properties of said overlying layer by said method which relates said ice sensor physical and electrical characteristics and said impedance values to said complex dielectric characteristics, means for using said total impedance, said complex dielectric properties and said measured thermal conductivity values to discriminate between said ice, rain water, deicing fluid or snow overlying said ice sensor, means for determining whether said ice is glaze or rime based on said measured value of said thermal conductivity, means for determining said thickness of said ice from said total impedance value by using said impedance value to locate appropriate laboratory measured ice properties stored in the data storage unit of said computer which is located in collocation with said ice sensor, means for comparing a shape of said locus determined from said calculated complex dielectric properties in said complex dielectric space with a characteristic semicircular shape exhibited by said ice as the independent check that said ice is present, means for determining whether said flaws, cracks or voids or enhanced electrical conductivity are present in said ice by examining said measured complex dielectric values in comparison with those for pure ice, means for correcting said ice thickness choice based on said initial total impedance measurements if said flaws, cracks or voids or higher electrical conductivity are found to exist, means for using said icing data from multiple ice sensor locations to construct the map of icing conditions occurring on said aircraft and to estimate a current weight penalty due to said icing, whereby the onset of icing on said aircraft along with said thickness of said ice buildup with time on said aircraft is detected by said externally mounted ice sensor, employing said method which discriminates between said ice, rain water, deicer fluid and snow overlying the ice sensor as well as discriminating between said glaze ice and rime ice based on following a series of procedures that make use of measurements of the properties of said contaminant layer overlying said ice sensor in comparison with said physical properties and said complex dielectric properties known for said ice and for said possible contaminants.

2. The aircraft ice detection system method recited in claim 1 further comprising: sending said icing data and said aural warning signals to said aircraft's pilot and to the pilot's display or to said unmanned aircraft's ground controller and to said ground controller's display to continuously alert them as to the aircraft's icing status and to also alert them if said ice thickness exceeds a pre-specified amount causing a dangerous condition to exist as well as sending said icing data to said aircraft's deicing system, if desired.

3. Apparatus for continuously measuring the onset, thickness, and buildup of ice thickness with time of ice on an external surface of an aircraft with the following collocated components; an external surface mounted ice sensor, a temperature measuring device, a thermal conductivity measuring device, and a total impedance measuring device in the form of a miniature electronic device comprising an Analog Devices AD5933 type chip, the aircraft's electrical power supply, electrical, control and data wire runs, a power converter, a computer with a data storage unit and a processor; said data storage unit containing laboratory measured and pre-stored ice data and equivalent data for possible contaminants, said processor containing program software and data reduction algorithms, with transceiver units used for system control signal and data transmission if a wireless communication approach is chosen, with all the elements of said ice detection apparatus selected from a class of miniature or micro-miniature, low power consumption, low profile electronic components and collocated together in a thin, pliable patch of minor vertical height, with visual and aural warning signals communicated to alert the pilot of the said aircraft, said apparatus comprising:

said surface mounted ice sensor attached externally to said aircraft, means for electrically exciting said ice sensor and an overlying contaminant layer with a frequency scan from near zero frequency to high frequency at a selected voltage, means for measuring said total impedance of an overlying layer during said near zero frequency to high frequency sweep, means for measuring a thermal conductivity of said overlying layer, means for storing and processing measured impedance data and thermal conductivity values, means for storing said laboratory measured ice data including total impedance versus said excitation frequency at multiple temperatures and also storing ice dielectric relaxation times, means for converting said impedance scan measurements into complex dielectric properties of said overlying layer, means for discriminating between said overlying layers of said ice, rain water, deicing fluid, or snow, means for comparing said impedance data and said thermal conductivity values with those characteristic of said laboratory ice data to determine an initial choice for said thickness of said ice, means for comparing complex dielectric properties with those characteristic of said ice, wherein said ice is known to exhibit a semicircular shaped locus in complex dielectric space as a function of said excitation frequency, means for determining whether flaws, cracks or voids or higher electrical conductivity are present in said ice layer, means to modify initially chosen ice thickness value for the presence of said flaws, cracks, or voids or higher electrical conductivity, if present, means to transmit said icing status data and said warning signals to said pilot or to a ground controller or said icing data to the deicing system, if desired, whereby said apparatus for detecting the onset of said icing on said aircraft and for continuously measuring said ice thickness, and said buildup of ice thickness with time is mounted in a thin, pliable patch to ease installation by allowing the option of gluing said patch directly to said aircraft's surface and with minor vertical height such that the presence of said patch does not interfere with said airflow around said aircraft or the airflow over said ice sensor, and the required measurements for the properties of said overlying layer, including said temperature, said thermal conductivity, said total impedance and said complex dielectric properties made with said ice sensor system whose components are all collocated together and constructed with miniature size, low profile shaped and economical chips, devices and components.

4. The apparatus recited in claim 3 wherein one embodiment for said ice sensor is a configuration employing two planar electrode plates spaced apart, facing each other and extending outward in a nearly vertical direction from the external surface.

5. The apparatus recited in claim 3 wherein the embodiment for said miniature impedance measuring electronic chip, that excites said contaminant layer overlying said ice sensor, is said Analog Devices electronic chip, AD5933, a 1 MSPS, 12-Bit Impedance Converter Network Analyzer of miniature size collocated physically with and electrically connected to said ice sensor.

6. The apparatus recited in claim 3 wherein the embodiments for said thermal conductivity and said temperature measuring devices are thermistors that employ glass encapsulated thermistors and which are collocated with said ice sensor and said impedance chip.

7. The apparatus recited in claim 6 wherein said processor is collocated with said ice sensor, said impedance chip, and said thermistor pair and used to store said impedance and said thermistor data, process same, and chose an initial value for said ice thickness.

8. The apparatus recited in claim 3 wherein the method described in "Ice Physics", Reference 7, by P. V. Hobbs, Clarendon Press, Oxford, 1974, and in particular the equations on pages 82 thru 85 of that reference, equations numbered (2.2) thru (2.12), is used or a similar development is used to convert said impedance data to said complex dielectric values over said frequency scan.

9. The apparatus recited in claim 3 wherein said ice is confirmed if said complex dielectric property locus in said complex dielectric space with varying frequency is of said semicircular shape; the characteristic shape of said ice.

10. The apparatus recited in claim 3 wherein said ice is also confirmed when a vector from approximately a quarter diameter point on a horizontal axis at a high frequency end of said semicircular locus, to a point on the opposite side of the locus corresponding to a pre-selected lower excitation frequency, is found to have approximately the same vector magnitude and inclination angle as a similar vector calculated from said stored laboratory measured ice data while keeping the product of said excitation frequency and the dielectric relation time constant the same for both points on the low frequency side of said locus.

11. The apparatus recited in claim 3 wherein the presence of said flaws, cracks or voids or higher electrical conductivity is determined from the magnitude of a diameter of said complex dielectric semicircular locus in said complex dielectric space in comparison to said diameter for pure ice.

12. The apparatus recited in claim 3 wherein said initial value chosen for said ice thickness based on said measured total impedance value is corrected for the effects of said flaws, cracks or voids or higher electrical conductivity if said effects are found.

13. The apparatus recited in claim 3 wherein a second embodiment for said ice sensor is a surface mounted, flush bullseye geometry sensor with a central circular area electrode surrounded by a second ring electrode of radial width.

14. The apparatus recited in claim 3 wherein a similar development, following the method in "Ice Physics", by P. V. Hobbs, Clarendon Press, Oxford, 1974, pages 82 thru 85, equations (2.2) thru (2.12), for said ice sensor employing parallel electrode plates, is used or a similar development used to relate physical and electrical characteristics of said bullseye type ice sensor to its said complex dielectric values; in order to identify the presence of said ice.

15. The apparatus recited in claim 3 wherein all elements of said ice detection system are collocated together in a thin pliable patch of diminished area that is mounted anywhere on said aircraft and does not effect the drag of said aircraft or a flowfield about said aircraft.

16. An aircraft ice detection system located on an external surface of an aircraft for measuring an onset of icing on said aircraft which continuously measures an ice thickness, an ice thickness buildup with time and an type of ice, glaze or rime, and which also provides several independent ways to confirm the presence of said ice, said system utilizing a combination of means to accomplish these results, a combination of selected parameters and measurements including temperature, thermal conductivity and said total impedance of a contaminant layer overlying said external ice sensor, the use of said measurements along with derived complex dielectric properties of said containment layer to discriminate between ice, rain water, deicer fluid and snow and then between glaze ice and rime ice lying over said ice sensor, software and algorithms providing methods to operate on said measurements, compare said measured results with laboratory measured ice data stored in a computer, a data storage unit and a processor combination collocated with said computer and said ice sensor and to select said ice, if present, from among possible contaminants, and by comparing a complex dielectric locus with that for said ice to provide an independent confirmation of said ice presence, also employing the size of a locus diameter in comparison to that of pure ice to discriminate between cracks, flaws and voids or higher electrical conductivity and the use of this result to correct an initially chosen ice thickness value for these effects, said ice detection system also using a unique combination of low power consumption, miniature size components with characteristic small footprints and reduced heights allowing all parts of said aircraft ice detection system to be collocated together, said system comprising:

means for detecting said onset of icing on said aircraft's external surfaces using an overlying layer's temperature, said thermal conductivity measurements, and said total impedance measurement values and the said derived complex dielectric properties, means for discriminating between said ice, rain water, deicing fluid or snow overlying said external surface mounted ice sensor, means for determining whether said ice is said glaze or rime, means for continuously determining said ice thickness and an ice thickness growth time history from said total impedance measurements of said overlying ice layer, means for independently confirming that said contaminant layer is said ice based on said complex dielectric properties determined from converting frequency scanned total impedance data, means which allow said collocation of said ice sensor, an impedance measuring electronic chip, a self-heated thermistor, a local temperature measuring thermistor, said computer, said data storage unit, said processor, said ice status and said data transfer and communication units and all other supporting equipment in a thin, pliant patch attached to said aircraft's external surface, means for communicating said ice status data and said warning signals to a pilot or to a ground controller of an unmanned aircraft.

17. The system recited in claim 16 wherein said embodiments for said ice sensor include a parallel plate or nearly parallel plate configurations which project out from the aircraft surface and a surface mounted, flush bullseye type configurations.

18. The system recited in claim 16 wherein said variable frequency, miniature electronic chip collocated with said ice sensor is used to measure said overlying layer total impedance data, store said data and process same; said embodiment of said impedance measuring chip being an Analog Devices electronic chip AD 5933.

19. The system recited in claim 16 wherein said method described in "Ice Physics", by P. V. Hobbs, Clarendon Press, Oxford, 1974, pages 82 thru 85, said equations (2.2) thru (2.12), is used or a similar development is used to calculate said complex dielectric properties of said overlying layer for a parallel plate type ice sensor and a modified version for a bullseye type ice sensor.

20. The system recited in claim 16 wherein said laboratory data measured by R. P. Auty, for said complex dielectric properties of said glaze ice and for said glaze ice dielectric relaxation times, and other similar data, are stored in said processor and used as a basis for comparison to newly measured data, in particular the stored data includes the data summarized in the Table II, page 33, temperature t=−10.6 C, the Table III, page 35, t=−0.1 C thru −65.8 C, and in the Appendix V, pages 47 thru 51, at temperatures of −1.5 C, −16.3 C, −27.5 C, −37.6 C, −50.6 C and −65.6 C respectively and the use of the procedure and the technique of J. W. Valvano, for the determination of said thermal conductivity of said overlying contaminant layer, in particular the following equation:

$$K_{\mathit{eff}} = \frac{1}{\frac{3\Delta T}{\Gamma a^2} - \frac{1}{5K_b}},$$

where $K_{\mathit{eff}}$ is the thermal conductivity, $\Delta T$ is the volume averaged temperature increase in degrees Celsius, $\Gamma$ is the steady-state volume power in watts/milliliter, a is the radius of the thermistor bead, and $K_b$ is the thermal conductivity of a self-heated thermistor bead.

* * * * *